(12) United States Patent
Kupershmidt et al.

(10) Patent No.: US 9,154,236 B2
(45) Date of Patent: Oct. 6, 2015

(54) SYSTEM FOR ALLOWING CO-EXISTENCE OF TRANSCEIVERS

(71) Applicants: Haim Kupershmidt, Or Yehuda (IL); Kobi Ben Atar, Givataim (IL); Naftali Chayat, Kfar Sab (IL); Moshe Haiut, Ramat-Gan (IL)

(72) Inventors: Haim Kupershmidt, Or Yehuda (IL); Kobi Ben Atar, Givataim (IL); Naftali Chayat, Kfar Sab (IL); Moshe Haiut, Ramat-Gan (IL)

(73) Assignee: DSP Group LTD., Herzeliya (IL)

( * ) Notice: Subject to any disclaimer, the term of this patent is extended or adjusted under 35 U.S.C. 154(b) by 214 days.

(21) Appl. No.: 13/625,863

(22) Filed: Sep. 24, 2012

(65) Prior Publication Data
US 2014/0087667 A1 Mar. 27, 2014

(51) Int. Cl.
*H04B 1/00* (2006.01)
*H04B 15/00* (2006.01)
*H04B 1/525* (2015.01)

(52) U.S. Cl.
CPC .............. *H04B 15/00* (2013.01); *H04B 1/525* (2013.01)

(58) Field of Classification Search
CPC ..... H04W 16/14; H04W 28/04; H04W 24/00; H04W 24/08; H04B 1/00; H04B 15/00; H04B 1/525; H04B 1/1027
USPC .............. 455/63.1, 67.11, 75–78, 500–502, 455/550.1, 552.1, 553.1
See application file for complete search history.

(56) References Cited

U.S. PATENT DOCUMENTS

| 8,005,513 B2 | 8/2011 | Risheq et al. | |
| 2004/0048576 A1* | 3/2004 | Hildebrand et al. | 455/67.3 |
| 2009/0130981 A1* | 5/2009 | Nagai et al. | 455/63.1 |

\* cited by examiner

*Primary Examiner* — Nhan Le
(74) *Attorney, Agent, or Firm* — Reches Patents

(57) ABSTRACT

A system may be provided and may include a first transmitter; a first antenna, coupled to the first transmitter; wherein the first transmitter is arranged to transmit via the first antenna first radio frequency (RF) signals; a first receiver; a second antenna, coupled to the first receiver; the second antenna differs from the first antenna; an RF acquisition module that is arranged to acquire second RF signals that are representative of the first RF signals; and an RF suppression module, arranged to receive the second RF signals and to generate RF suppression signals for suppressing an effect of a transmission of the first RF signals on the first receiver, and to provide the RF suppression signals to the first receiver.

25 Claims, 19 Drawing Sheets

601

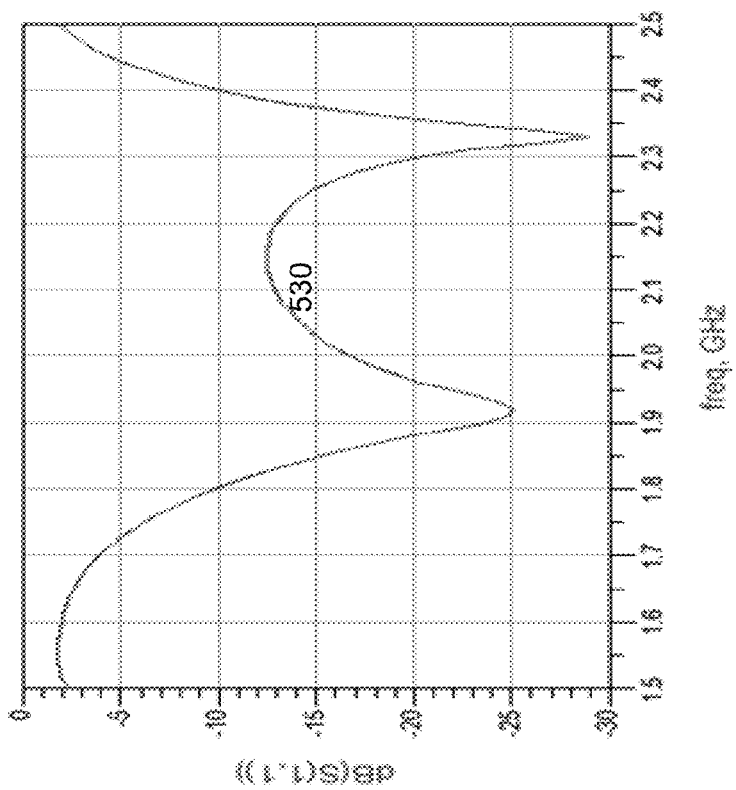
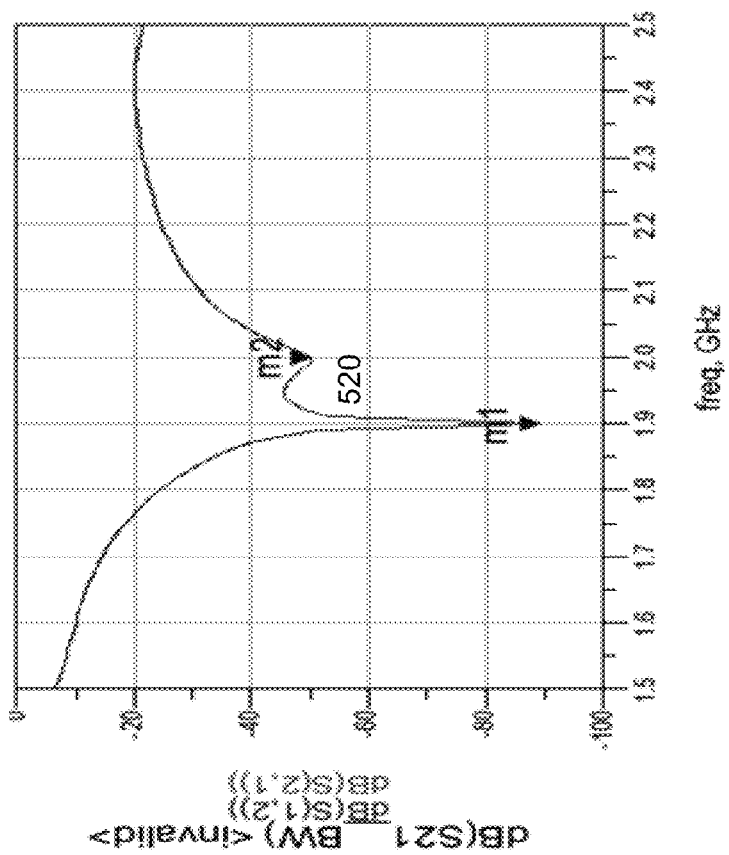
FIG. 18

Activating a system such as any of the systems mentioned in any of the previous figures.
1910

SYSTEM FOR ALLOWING CO-EXISTENCE OF TRANSCEIVERS

BACKGROUND OF THE INVENTION

In various countries Digital Enhanced Cordless Telecommunications (DECT) frequencies used by DETC receivers and DECT transmitters may be very close to the frequencies utilized by second generation (2G), third generation (3G) and even fourth generation (4G) cellular networks.

Some products (such as Home Automation controller/concentrator) may have both DECT transceivers (for Home Automation control purposes) and cellular transceivers (for emergency calls to service center) integrated in the same box. This may cause severe interference problems.

There is a growing need to provide an efficient device for mitigating these interference problems.

SUMMARY OF THE INVENTION

According to various embodiments of the invention there may be provided a system that may include a first transmitter; a first antenna, coupled to the first transmitter; wherein the first transmitter may be arranged to transmit via the first antenna first radio frequency (RF) signals; a first receiver; a second antenna, coupled to the first receiver; the second antenna differs from the first antenna; an RF acquisition module that may be arranged to acquire second RF signals that are representative of the first RF signals; and an RF suppression module, arranged to receive the second RF signals and to generate RF suppression signals for suppressing an effect of a transmission of the first RF signals on the first receiver, and to provide the RF suppression signals to the first receiver.

The first transmitter may be arranged to transmit according a first communication standard and the first receiver may be arranged to receive signals according to a second communication standard that differs from the first communication standard.

The system may include a first transceiver and a second transceiver; wherein the first transceiver may include the first transmitter and a second receiver; and wherein the second transceiver may include the first receiver and a second transmitter.

The RF suppression module may be adapted to generate additional RF suppression signals for suppressing an effect of a transmission by the second transmitter on the second receiver.

The RF suppression module may be arranged to apply a same transfer function for suppressing the effect of the transmission by the second transmitter on the second receiver and for suppressing the effect of the transmission of the first RF signals on the first receiver.

The RF suppression module may include first terminals that are coupled to the first transceiver and second terminals that are coupled to the second transceiver; wherein the RF suppression module may include a configurable RF filter that may be coupled between the first terminals and the second terminals and wherein the configurable RF filter may be arranged to apply a same transfer function on RF signals that are received from the first terminals and on RF signals that are received from the second terminals.

The RF acquisition module may include a third antenna that differs from the first and second antennas; and wherein the RF suppression module may be adapted to transmit the additional RF suppression signals via the third antenna.

The first transmitter may be coupled, via a first transmitter RF switch, to multiple first antennas; wherein the first transmitter RF switch may be arranged to select at least one selected first transmitter antenna of the multiple first antennas; and wherein the RF suppression module may be arranged to generate the RF suppression signals in response to a selection of the at least one first selected antenna.

The RF suppression module may include a sub-module per each selection of the at least one first selected first antenna.

The first receiver may be coupled, via a first receiver RF switch, to multiple second antennas; wherein the first receiver RF switch may be arranged to select at least one selected first receiver antenna of the multiple second antennas; and wherein the RF suppression module may be arranged to generate the RF suppression signals in response to a selection of the at least one second selected antenna.

The first transmitter may be coupled, via a first transmitter RF switch, to multiple first antennas; wherein the first transmitter RF switch may be arranged to select at least one selected first transmitter antenna of the multiple first antennas; and wherein the RF suppression module may be arranged to generate the RF suppression signals in response to a selection of the at least one first selected antenna and to a selection of the second selected antenna.

The first receiver may be coupled to multiple second antennas.

The first transmitter may be coupled to multiple first antennas.

The RF acquisition module may include a third antenna that differs from the first and second antennas for receiving RF signals representative of the first RF signals.

The RF acquisition module may be arranged to wirelessly acquire the second RF signals.

The RF acquisition module may include a RF coupler that may be coupled to the first antenna or to a RF component of the first transmitter.

The RF suppression module may include a configurable RF filter; wherein the configurable RF filter may be coupled to a controller that belongs to the system; wherein the controller may be arranged to configure the configurable RF filter during at least one configuration period.

The controller may be arranged to: configure the configurable RF module according to a current configuration; evaluate an outcome of the current configuration to provide an evaluation result; determine whether the current configuration should be maintained or changed; and change the current configuration if it is determined to change the current configuration.

The controller may be arranged to evaluate the outcome of the current configuration in response to a first transmitter transmission indicator.

The first transmitter may be arranged to generate the first transmitter transmission indicator.

The RF acquisition module may include an RF coupler that may be coupled to the first antenna or to an RF component of the first transmitter; wherein the RF coupler may be coupled to an RF detection module that may be arranged to generate the first transmitter transmission indicator.

The RF acquisition module may include a third antenna that differs from the first and second antennas; wherein the third antenna may be coupled to an RF detection module that may be arranged to generate the first transmitter transmission indicator.

The configurable RF filter may include multiple configurable resonant modules and delay elements.

The configurable RF filter may include two input terminals, wherein a first configurable resonant module may be coupled between the two input terminals, wherein a first pair of delay elements may be coupled between the first configurable resonant module and a second resonant module.

The configurable RF filter may include a frequency discriminating module.

The first transmitter may be arranged to transmit cellular network compliant signals and the first receiver may be arranged to receive Digital Enhanced Cordless Telecommunications (DECT) compliant signals.

The first receiver and the first transmitter may be positioned within a same housing.

There may be provided a system that may include an RF acquisition module that may be arranged to acquire second RF signals that are representative of first RF signals that are transmitted through a first antenna that may be coupled to a first transmitter; and an RF suppression module, arranged to receive the second RF signals, to generate RF suppression signals for suppressing an effect of a transmission of the first RF signals on a first receiver, and to provide the RF suppression signals to the first receiver; wherein the first receiver may be coupled to a second antenna that differs from the first antenna; and a controller; wherein the RF suppression module may include a configurable RF filter; wherein the controller may be arranged to configure the configurable RF filter during at least one configuration period.

Any combinations of any of the components of any of the figures can be provided. Any combination of any of the mentioned above systems can be provided.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof may best be understood by reference to the following detailed description when read with the accompanying drawings in which:

FIGS. 16-18 are simulation results of two scenarios according to an embodiment of the invention; and FIG. 19 illustrates a method according to an embodiment of the invention.

Figure 1:
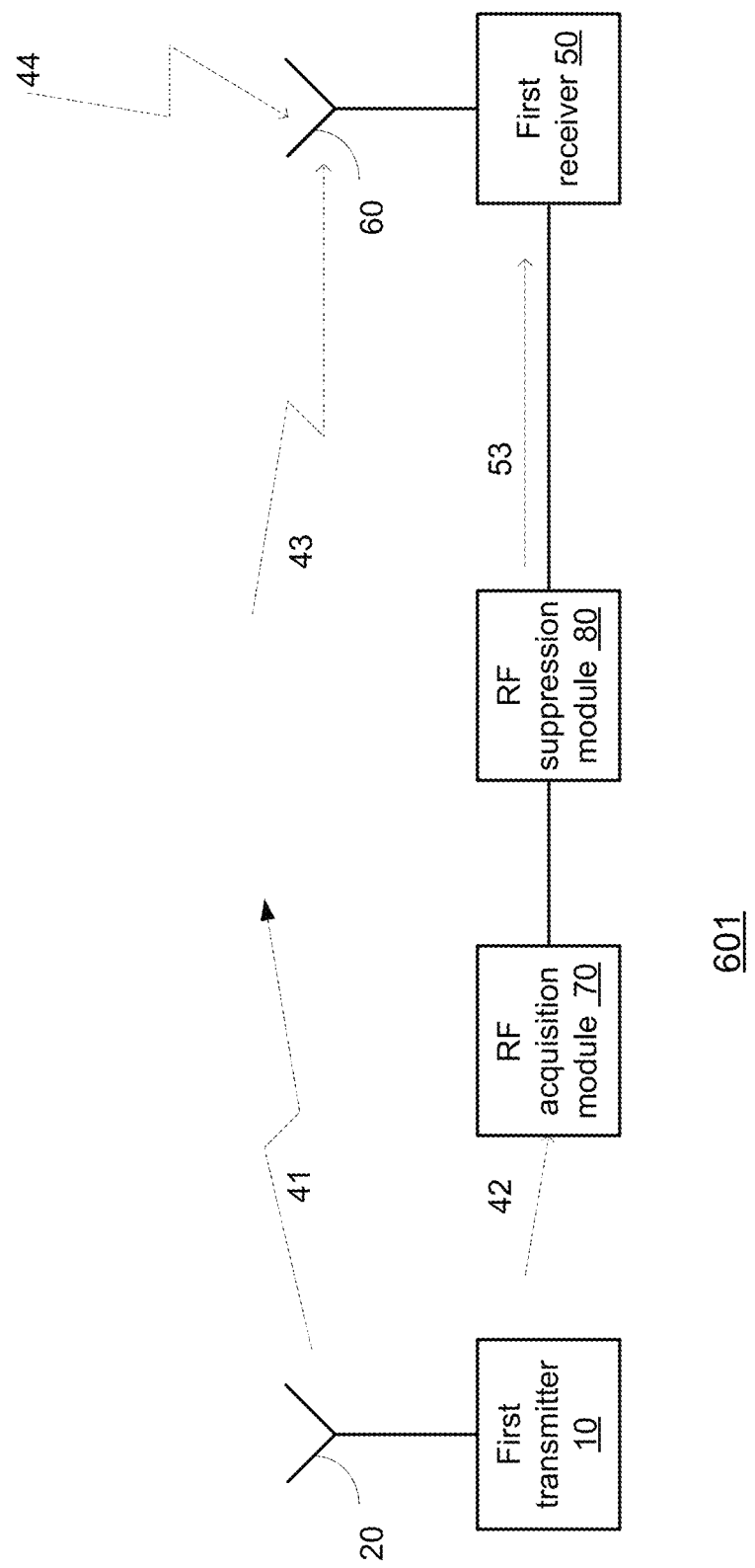
FIG. 1 illustrates a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may, for the most part, be implemented using electronic components and modules known to those skilled in the art, details will not be explained in any greater extent than that considered necessary as illustrated above, for the understanding and appreciation of the underlying concepts of the present invention and in order not to obfuscate or distract from the teachings of the present invention.

RF stands for radio frequency.

The terms "DECT receiver" and "DECT compliant receiver" are used in an interchangeable manner.

The following text may refer to DECT receivers, DECT transmitters, cellular transmitters or cellular receivers. It is noted that these are non-limiting examples and that various embodiments of the invention include other types of receivers and transmitters—such as receivers and transmitters that are arranged to receive or transmit signals according to communication protocols that differ from DECT or cellular communication protocols. A cellular receiver or cellular transmitter can be a part of a cellular network. The cellular network can exchange signals according to third generation (3G) cellular communication protocols, fourth generation (4G) cellular communication protocols or any other cellular communication protocol.

Receiver and Transmitter

FIG. 1

FIG. 1 illustrates system 601 according to an embodiment of the invention.

System 601 includes a first transmitter 10, a first antenna 20, a first receiver 50, a second antenna 60, a RF acquisition module 70 and an RF suppression module 80.

The first transmitter 10 is coupled to the first antenna 20. The first receiver 50 is coupled to the second antenna 60.

The RF suppression module 80 is coupled to the first receiver 50 and to the RF acquisition module 70.

The first transmitter 10 is arranged to transmit via the first antenna 20 first RF signals 41. The first RF signals 41 can be viewed as the signals transmitted from the first antenna 20 or those that are fed to the first antenna 20 by the first transmitter 10.

The first receiver 50 is not the desired target of the transmission of the first RF signals 41. The first receiver 50 is the desired target of fourth RF signals 44 that are transmitted from another RF source (not shown).

The RF acquisition module 70 may be arranged to acquire second RF signals 42 that are representative of the first RF signals 41. The second RF signals 42 can be equal to the first RF signals 41 or may differ by a transmission characteristic (power, energy, phase, amplitude, group delay) but in any case are expected to convey the same content as the first RF signals 41.

Figure 2:
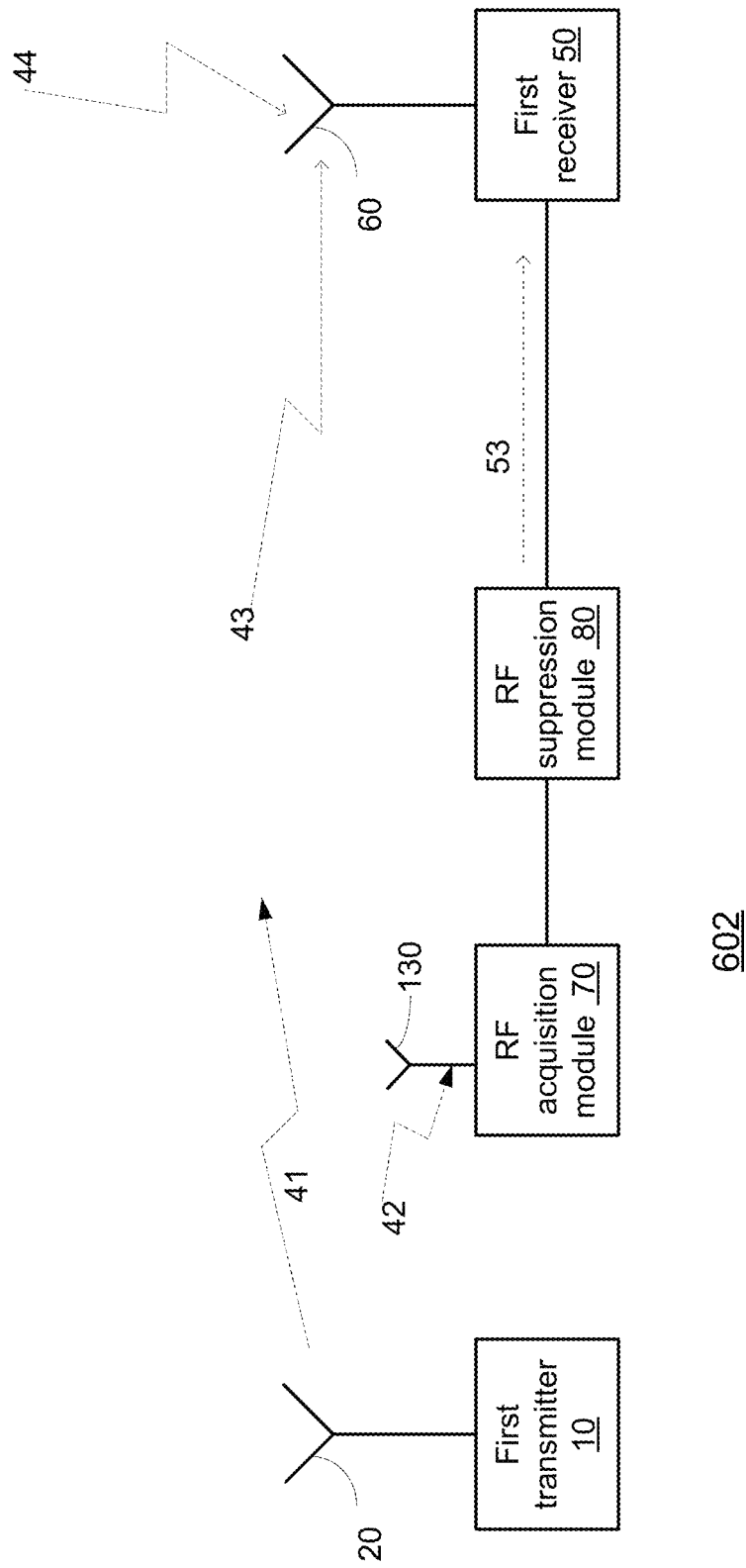
FIG. 2 illustrates a system according to an embodiment of the invention.

The RF acquisition module 70 can acquire the second RF signals 42 via the air (for example—by using an antenna such as third antenna 130 of FIG. 2), or may utilize one or more RF couplers (such as RF coupler 200 of FIG. 3) that receives RF signals from the first transmitter 10 even before these RF signals are transmitted by the first antenna 20.

The RF suppression module 80 is arranged to receive the second RF signals 42 and to generate RF suppression signals 53 for suppressing an effect of a transmission of the first RF signals 41 on the first receiver 50. The RF suppression module 80 may provide the RF suppression signals 53 to the first receiver 50.

The first receiver 50 can be arranged to receive third RF signals 43 that represent the first RF signals 41, to receive the RF suppression signals 53 and to receive the fourth RF signals 44.

The RF suppression signals 53, when received by the first receiver 50, may cause the first receiver 50 to output receiver output signals that are responsive mainly to the fourth RF signals 44. The RF suppression signals 53 may completely mask the third RF signals 43 but this is not necessarily so and that can only partially mask (or reduce the effect of) the third RF signals 43.

According to various embodiments of the invention the first transmitter 10 may be arranged to transmit according a first communication standard and the first receiver 50 may be arranged to receive signals according to a second communication standard that may differ from the first communication standard.

Either one of the first or second communication standards can be a DECT standard, a cellular standard or any other standard.

The first and second communication standards may differ from each other by transmission and/or reception frequencies.

The transmission frequency range of the first transmitter 10 can be proximate to the reception frequency range of the first receiver 50. These frequency ranges can overlap, partially overlap or be non-overlapping.

FIG. 2

FIG. 2 illustrates system 602 according to an embodiment of the invention.

In FIG. 2 the RF acquisition module 70 is illustrated as having third antenna 130.

FIG. 3

Figure 3:
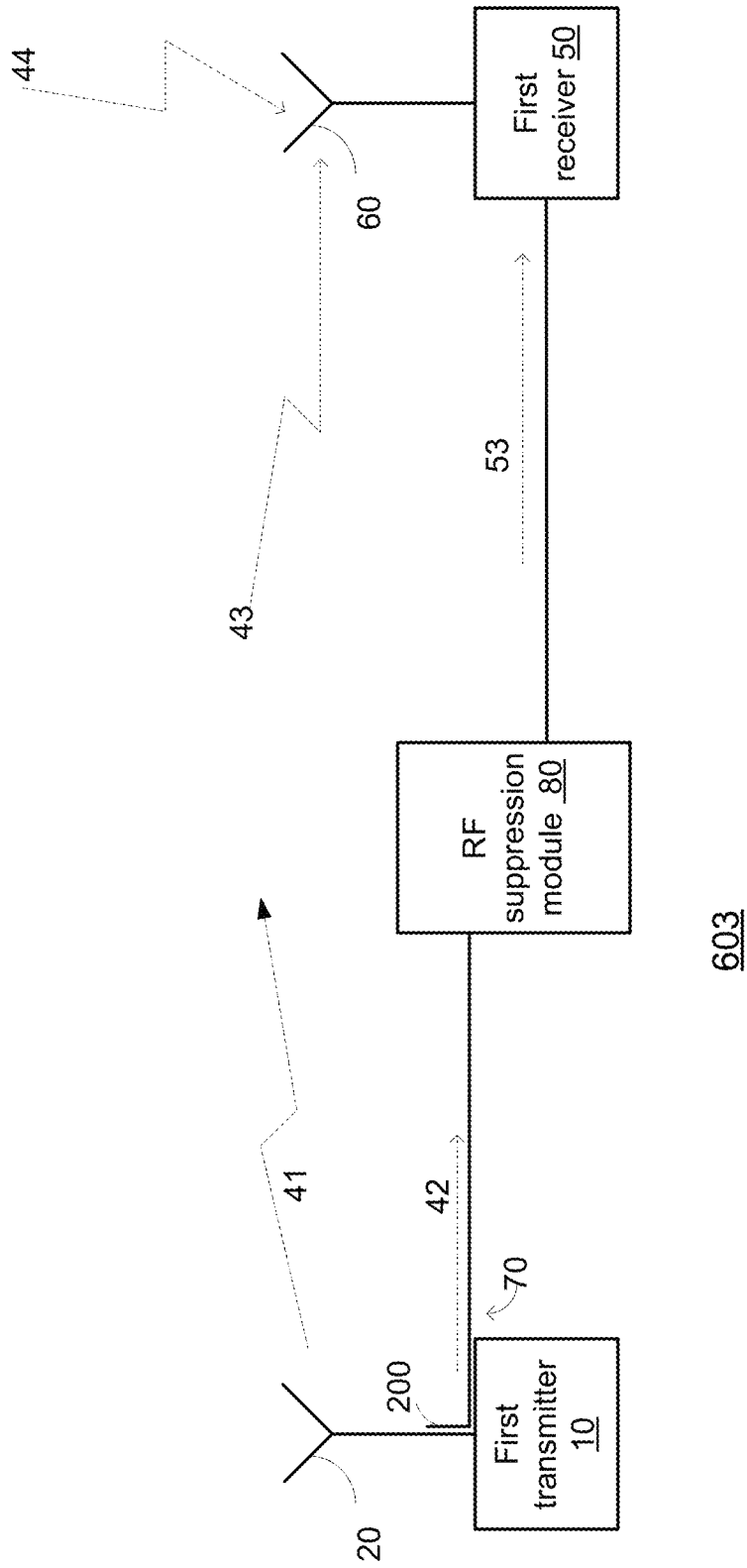
FIG. 3 illustrates a system according to an embodiment of the invention.

FIG. 3 illustrates system 603 according to an embodiment of the invention.

In FIG. 3 the RF acquisition module 70 is illustrated as having an RF coupler 200 that receives RF signals from the first transmitter 10—before these signals are transmitted by the first antenna 20.

Any one of systems 601-603 may include a controller (not shown) for controlling the operation of at least one of the components of the system. The controller can be included in the first transmitter 10, can be included in the first receiver 50 or can be logically positioned outside the first receiver 50 and the first transmitter 10. The controller, for example, can control a configuration process of the RF suppression module.

First and Second Transceivers

FIG. 4

Figure 4:
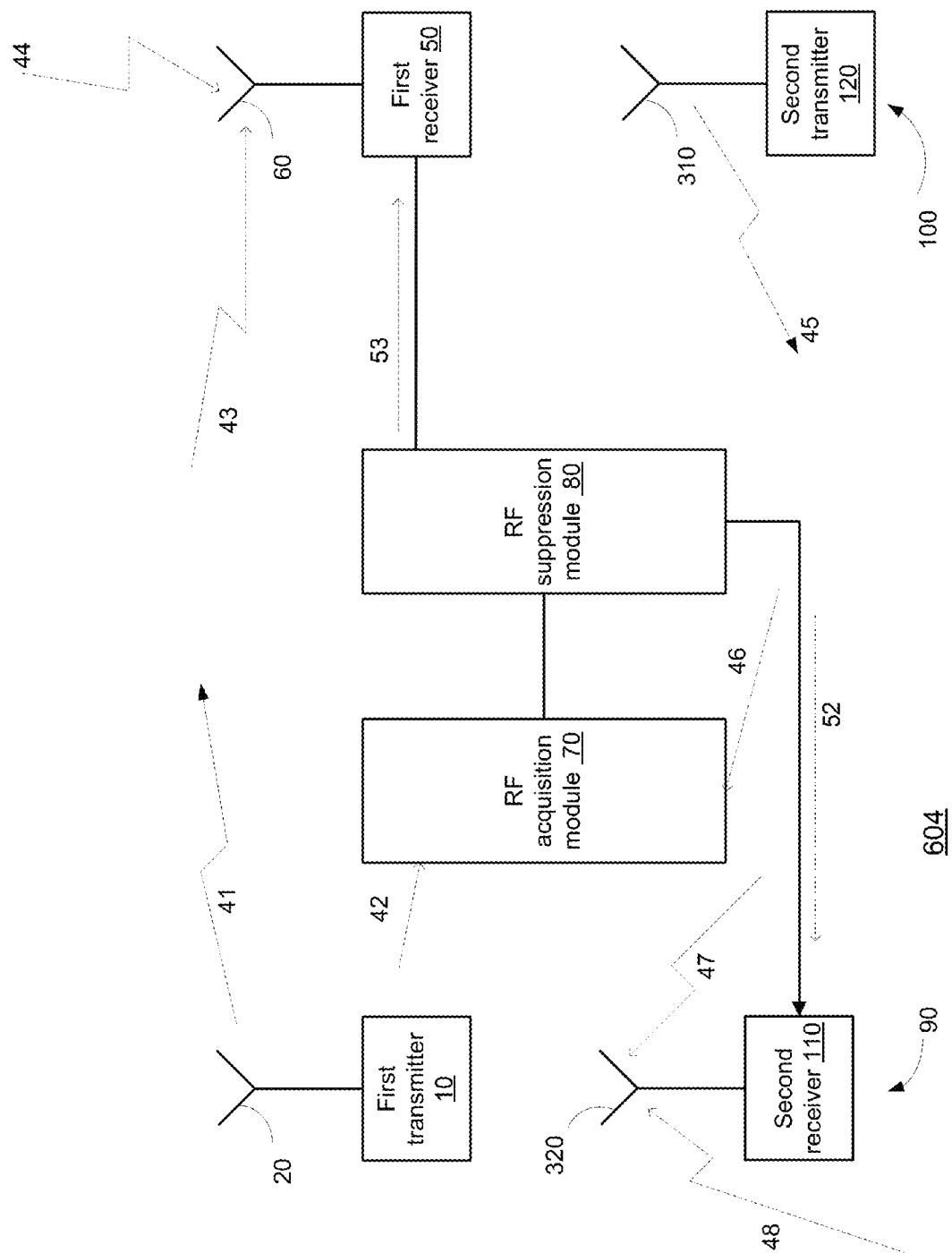
FIG. 4 illustrates a system according to an embodiment of the invention.

FIG. 4 illustrates system 604 according to an embodiment of the invention.

System 604 may include a first transceiver 90 and a second transceiver 100.

The first transceiver 90 may include the first transmitter 10 and a second receiver 110. The second transceiver 100 may include the first receiver and 50 a second transmitter 120.

The second transmitter 120 is coupled to a fourth antenna 310. The second receiver 110 is coupled to a fifth antenna 320.

The fifth antenna 320 can differ from the first antenna 20 or can be the same antenna. The forth antenna 310 can differ from the second antenna 60 or can be the same antenna.

The second transmitter 120 is arranged to transmit via the fourth antenna 310 fifth RF signals 45. The fifth RF signals 45 can be viewed as the signals transmitted from the fourth antenna 310 or those that are fed to the fourth antenna 310 by the second transmitter 120.

The RF acquisition module 70 may be arranged to acquire sixth RF signals 46 that are representative of the fifth RF signals 45 and may be arranged to acquire the second RF signals 42 that are indicative of the first RF signals 41.

Figure 5:
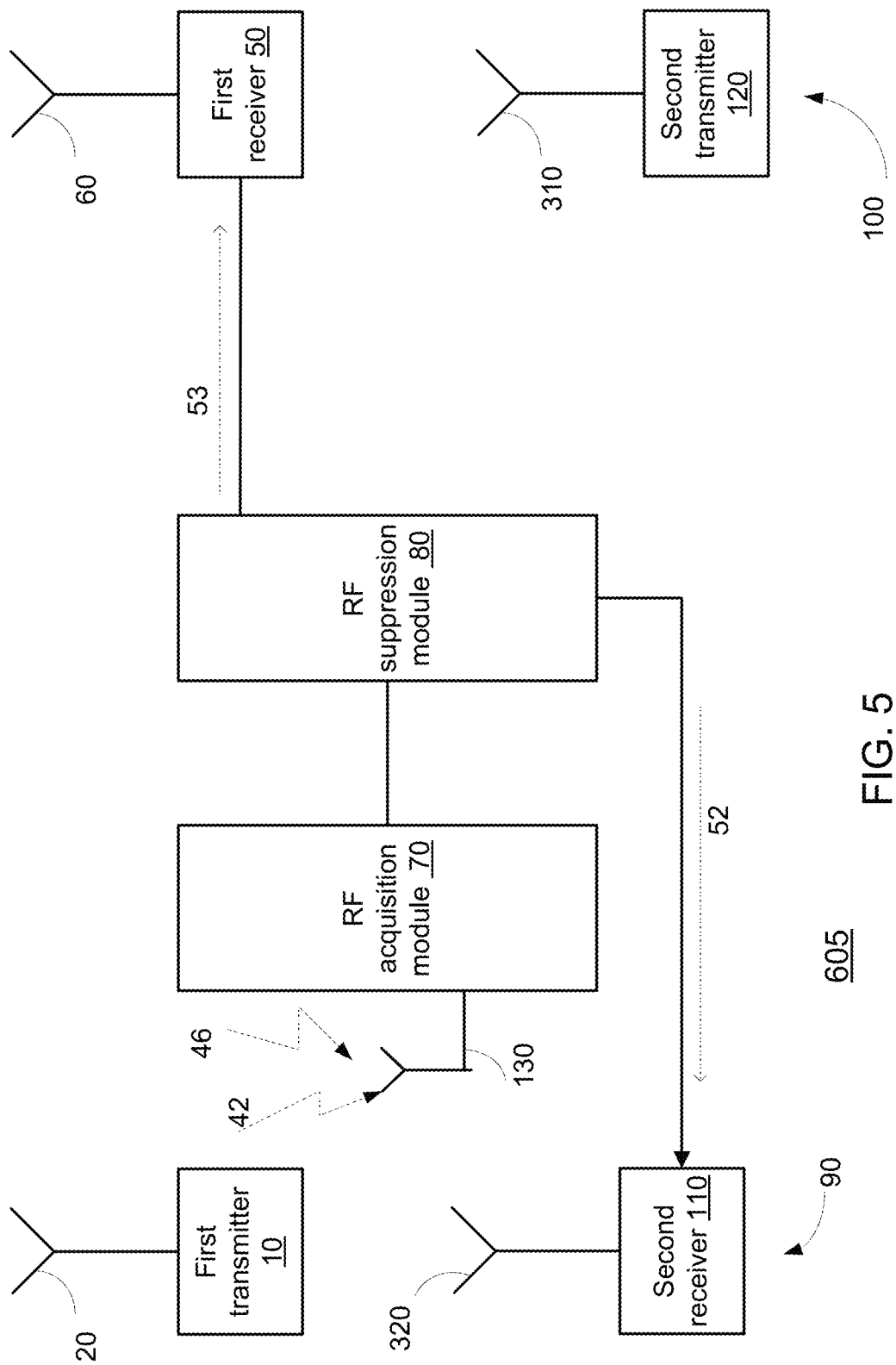
FIG. 5 illustrates a system according to an embodiment of the invention.

The RF acquisition module 70 can acquire the sixth RF signals 46 via the air (for example—by using an antenna such as third antenna 130 of FIG. 5), or may utilize an RF coupler (such as RF coupler 201 of FIG. 6) that receives an RF signals from the second transmitter 120—before these RF signals are transmitted by the fourth antenna 310. The RF acquisition module 70 also receives RF signals from the first transmitter 10 via RF coupler 200.

It is noted that the RF acquisition module 70 can acquire the sixth RF signals 46 in the same manner (wireless or via a coupling) as it acquired the second RF signals 42 but may acquire these different RF signals in a different manner.

The RF suppression module 80 is arranged to receive the sixth RF signals 46 and to generate additional RF suppression signals 52 for suppressing an effect of a transmission of the fifth RF signals 45 on the second receiver 110. The RF suppression module 80 may provide the additional RF suppression signals 52 to the second receiver 110.

The second receiver 110 is not the desired target of the transmission of the fifth RF signals 45. The second receiver 110 is the desired target of eighth RF signals 48 that are transmitted from another RF source.

The second receiver 110 can be arranged to receive seventh RF signals 47 that represent the fifth RF signals 45, to receive the additional RF suppression signals 52 and to receive the eighth RF signals 52.

The additional RF suppression signals 52, when received by the second receiver 110, may cause the second receiver 110 to output second receiver output signals that are responsive mainly to the eighth RF signals 48. The RF additional suppression signals 52 may completely mask the fifth RF signals 45 but this is not necessarily so and that can only partially mask (or reduce the effect of) the seventh RF signals 47 on the second receiver 110.

The RF suppression module 80 can be arranged to apply a same transfer function for suppressing the effect of the transmission by the second transmitter 120 on the second receiver 110 and for suppressing the effect of the transmission by the first transmitter 10 on the first receiver 50.

The RF suppression module 80 may apply the same transfer function regardless of a direction of propagation of RF signals within the RF suppression module 80. Assuming, for example, that the RF suppression module 80 has first terminals that are coupled to the first transceiver 90 and second terminals that are coupled to the second transceiver 100 then the same transfer function is applied on RF signals that are received from the first terminals and on RF signals that are received from the second terminals.

Alternatively—the RF suppression module 80 can be arranged to apply a different transfer functions for (a) suppressing the effect of the transmission by the second transmitter 120 on the second receiver 110 and for (b) suppressing the effect of the transmission by the first transmitter 10 on the first receiver 50.

According to various embodiments of the invention the RF suppression module 80 can include a first portion for suppressing the effect of the transmission by the second transmitter 120 on the second receiver 110 and a second portion for suppressing the effect of the transmission by the first transmitter 10 on the first receiver 50. There may also be provided a separate RF suppression module per each transceiver.

FIG. 5

FIG. 5 illustrates system 605 according to an embodiment of the invention. In FIG. 5 the RF acquisition module 70 is illustrated as having a third antenna 130. According to an embodiment of the invention the RF acquisition module 70 when using such a third antenna 130 is not aware whether it received the second or sixth RF signals 42 and 46. Yet according to another embodiment of the invention the RF acquisition module 70 can have separate channels for the reception of the second and sixth RF signals (42 and 46)—for example by using a third antenna that has separate sectors (or having a pair of highly directional antennas), that are directed towards separate antennas out of antennas 20 and 310.

FIG. 6

Figure 6:
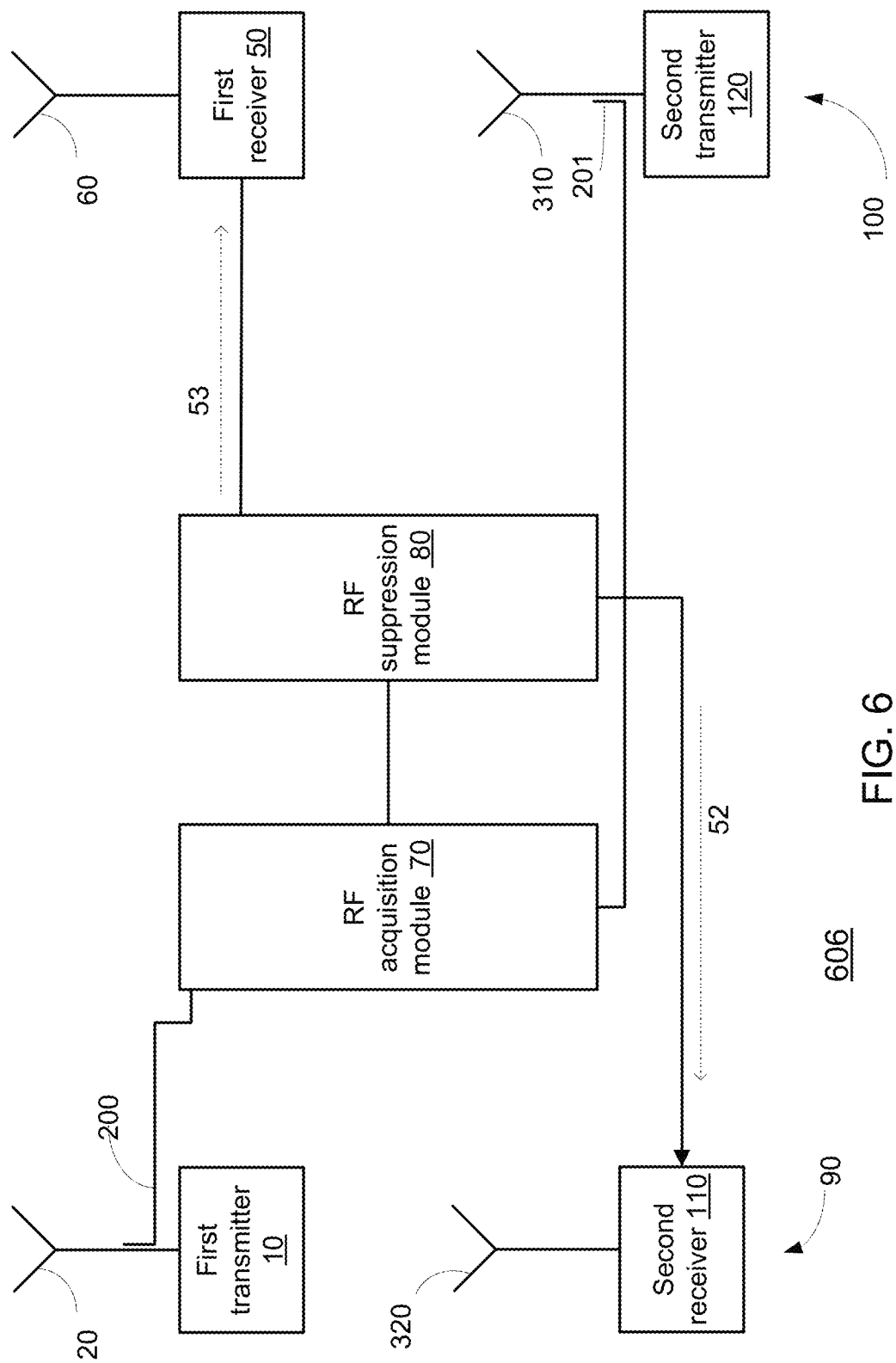
FIG. 6 illustrates a system according to an embodiment of the invention.

FIG. 6 illustrates system 606 according to an embodiment of the invention. In FIG. 6 the RF acquisition module 70 is illustrated as having (a) an RF coupler 201 that receives RF signals from the second transmitter 120—before these signals are transmitted by the fourth antenna 310, and (b) an RF coupler 200 that receives RF signals from the first transmitter 10—before these signals are transmitted by the first antenna 20.

FIG. 7

Figure 7:
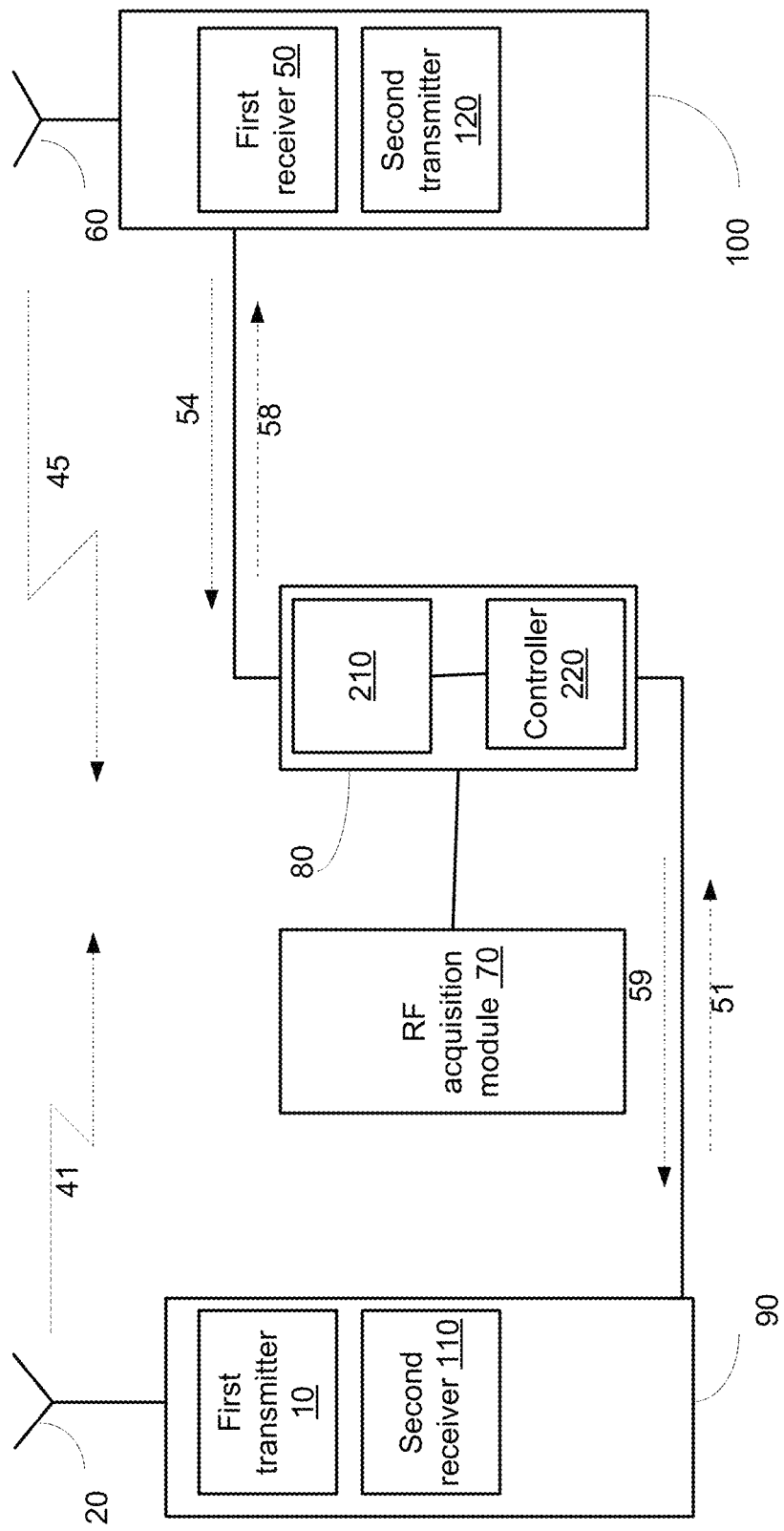
FIG. 7 illustrates a system according to an embodiment of the invention.

FIG. 7 illustrates system 607 according to an embodiment of the invention.

System 607 of FIG. 7 differs from system 604 of FIG. 4 by including a controller 220. Controller 220 is illustrates as being a part of the RF suppression module 80.

System 7 also differs from system 4 by having (instead of the first and fourth antennas 20 and 310 of FIG. 4) only first antenna 20 and by having second antenna 60 (instead of having the second and fifth antennas 60 and 320 of FIG. 4).

The controller 220 is arranged to control the operation of at least one of the components of the system. The controller 220 can be included in either one of the first transmitter 10, the second transmitter 120 and the second receiver 110. Alternatively, the controller 220 can be logically positioned outside each of these components. FIG. 7 illustrates the controller 220 as belonging to the RF suppression module 80 but may be coupled to the RF suppression module without belonging to the RF suppression module 80.

The controller 220 may be arranged to control a configuration process of the RF suppression module 80.

FIG. 7 also illustrates the RF suppression module 80 as including a configurable RF filter 210. The controller 220 may be arranged to configure the configurable RF filter 210 by applying a configuration process that may occur during at least one configuration period.

The configuration process can be executed when the first and/or second transceivers 90 and 100 are being initialized, are idle or are configured or during the normal operation of the first and/or second transceivers 90 and 100.

The timing of the configuration process can follow a predefined pattern, can be determined in a pseudo-random manner, or can be determined in a random manner.

The controller 220 can determine to perform a configuration process in response to an event such as a change in a reception parameter, a change in a transmission parameter, or both. Changes in a reception or transmission parameter may include change of transmission channel, change in reception channel, changes in reception error levels, and the like.

According to various embodiment of the invention the configuration process can be of an iterative nature—one or more configuration iterations can be executed until a required result is obtained, a configuration period expired or a maximal number of iterations were reached.

The controller 220 may be arranged to execute one or more iterations, each iteration may include: configuring the configurable RF module according to a current configuration; evaluating an outcome of the current configuration to provide an evaluation result; determining whether the current configuration should be maintained or changed; and changing the current configuration if it is determined to change the current configuration.

The controller 220 may be arranged to evaluate the outcome of the current configuration in response to a first transmitter (TX) transmission indicator 51 that indicates when the first transmitter 10 transmits the first RF signals 41.

The first TX transmission indicator 51 is an analog or digital control signal that may differ from an RF signal and may assist the controller 220 in timing the configuration process. It may be desirable to evaluate an outcome of the current configuration in response to signals received when the first RF signals 41 were transmitted.

It is noted that the controller 220 can apply the same control scheme in relation to the second transmitter 120. For example, the controller 220 can evaluate the outcome of a current configuration in response to a second TX transmission indicator 54 that indicates when the second transmitter 120 transmits the fifth RF signals 45.

It is further noted that each one of the systems of FIGS. 1-3 can include a controller (such as controller 220) that may apply the same control scheme as illustrated in the previous text.

Multiple Antennas

Multiple antennas can be coupled to a receiver to provide multiple receiving antennas. Additionally or alternatively, multiple antennas can be coupled to a transmitter to provide multiple transmit antennas.

The transmitter can transmit RF signals via a single transmit antenna. Additionally or alternatively, a transmitter can concurrently transmit RF signals via more than a single transmit antenna of the multiple transmit antennas. It is noted that when multiple transmit antennas are used the signals that are sent to each antenna can differ from each other by phase and/or amplitude or may equal to each other. Different signals per antenna can be used when applying various Multiple Input Multiple Output (MIMO) techniques.

The receiver can receive RF signals via a single receive antenna. Additionally or alternatively, a receiver can concurrently receive RF signals via more than a single receive antenna of the multiple receive antennas. Multiple receive antennas can be used when applying MIMO techniques.

According to various embodiments of the invention, the RF suppression module 80 may be configured to apply a transfer function that is responsive to the one or more transmit antennas and one or more transmit antennas that are being used.

According to an embodiment of the invention if there are T transmit antennas and R receive antennas and only a single transmit antenna and a single receive antenna can be used at each point in time, then the RF suppression module 80 can be configured to apply up to R*T different configurations.

The RF suppression module 80 can receive an indication about the one or more selected transmit antenna from RF detectors that may monitor which transmit antenna is being used. Additionally or alternatively, the RF suppression module 80 may receive control signals (from a controller, from a receiver and/or from a transmitter) that are indicative of the selected antennas. Non-limiting examples of the control signals include first TX transmission signal 51 of FIG. 7 and second TX transmission signal 54 of FIG. 7. Other control signals may indicate which receive antenna is being used to receive RF signals.

FIG. 8

Figure 8:
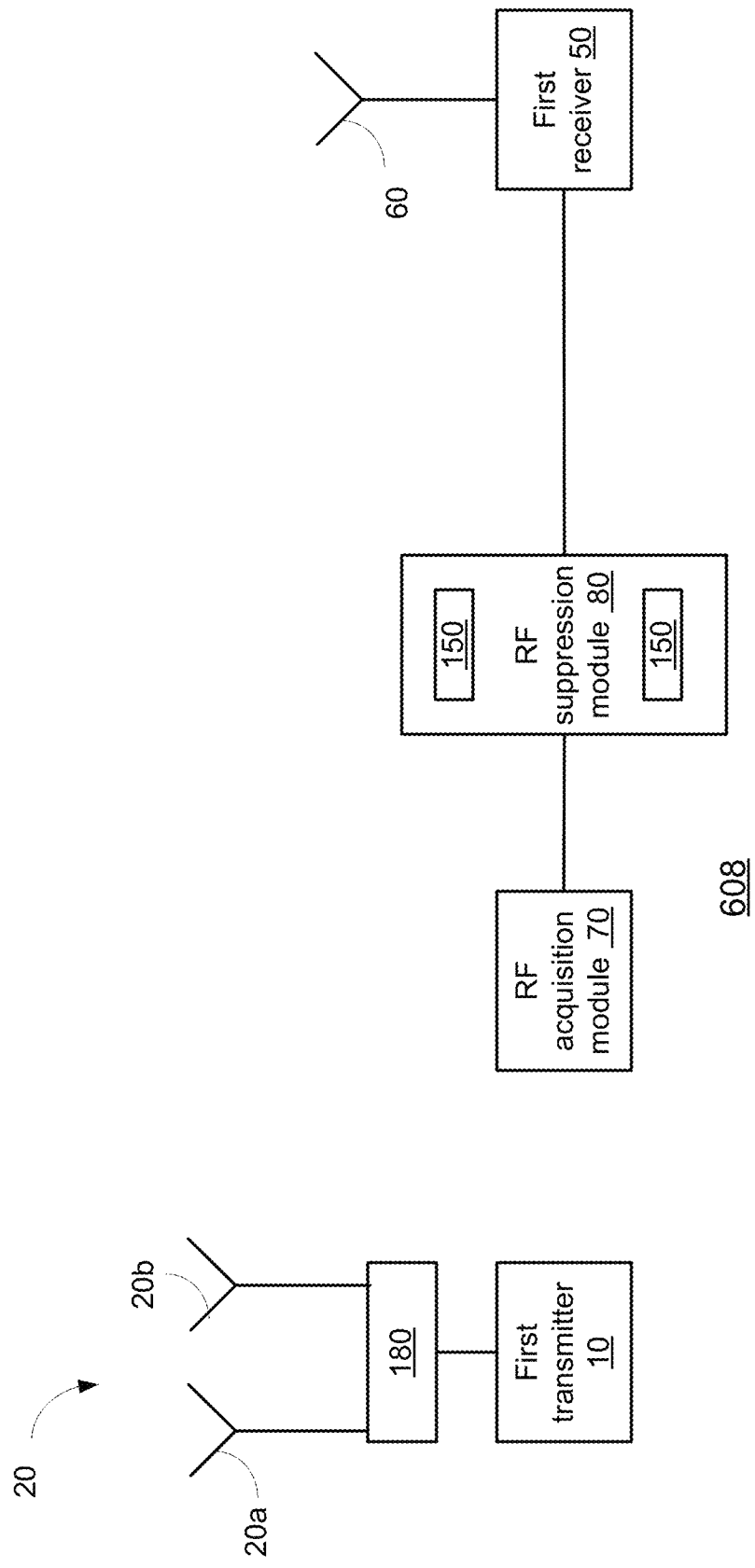
FIG. 8 illustrates a system according to an embodiment of the invention.

FIG. 8 illustrates system 608 according to an embodiment of the invention.

FIG. 8 illustrates a scenario in which transmit diversity is applied and the first transmitter 10 is coupled, via a first transmitter RF switch 180, to multiple first antennas 20a and 20b collectively denoted 20

The first RF switch 180 may be arranged to select at least one selected first antenna of the multiple first antennas 20.

The RF suppression module 80 may be arranged to generate the RF suppression signals in response to a selection of the at least one first selected antennas.

According to an embodiment of the invention the RF suppression module 80 includes a sub-module 150 per each selection of the at least one first selected antenna 30 such as the two sub-modules 150 of FIG. 8.

FIG. 9

Figure 9:
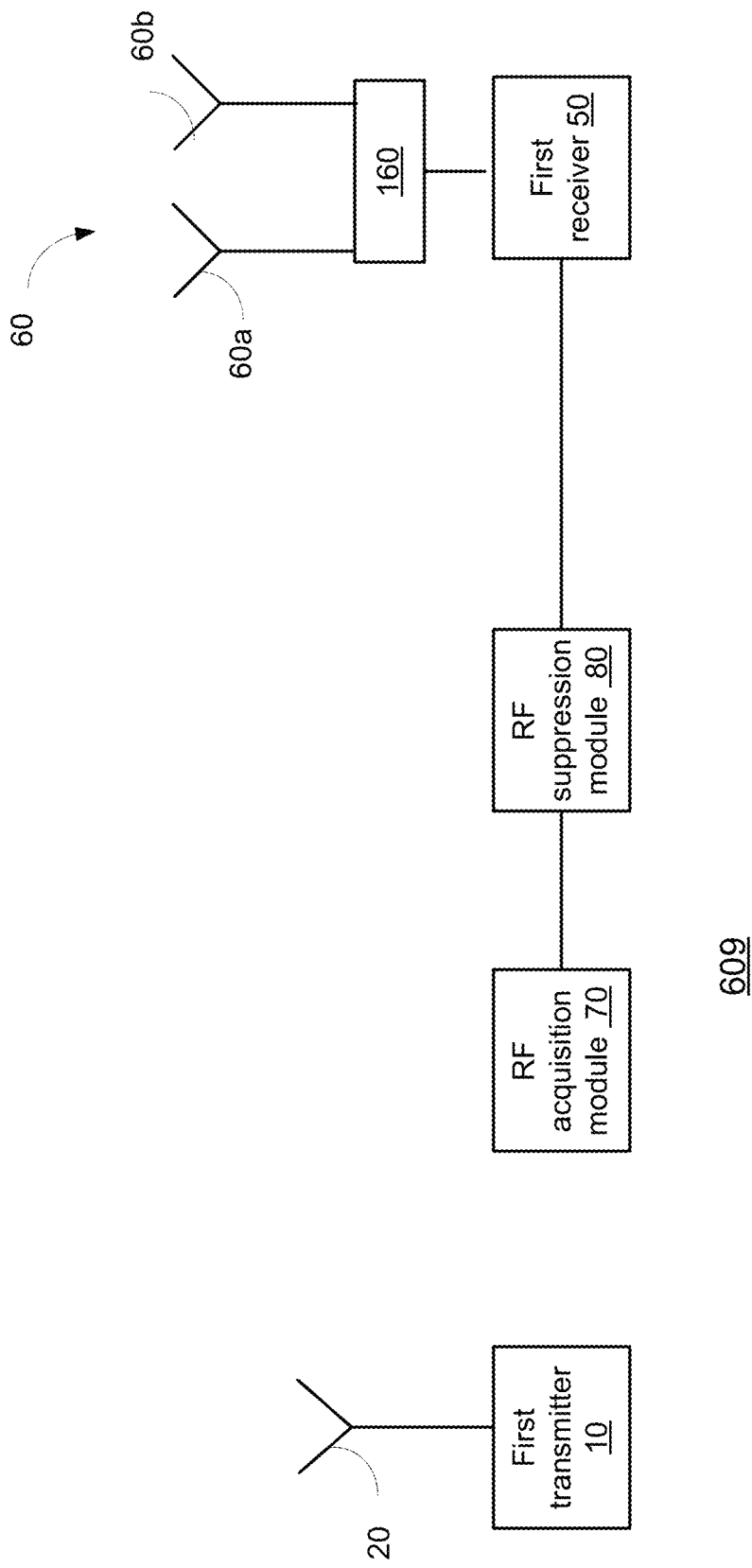
FIG. 9 illustrates a system according to an embodiment of the invention.

FIG. 9 illustrates system 609 according to an embodiment of the invention.

System 609 supports receive diversity. The first receiver 50 is coupled, via a second RF switch 160, to multiple second antennas 60a and 60b collectively denoted 60.

It is noted that in case of reception diversity the RF suppression module 80 may be arranged to generate RF suppression signals in response to a selection of at least one second selected antennas coupled to the first receiver 50.

FIG. 10

Figure 10:
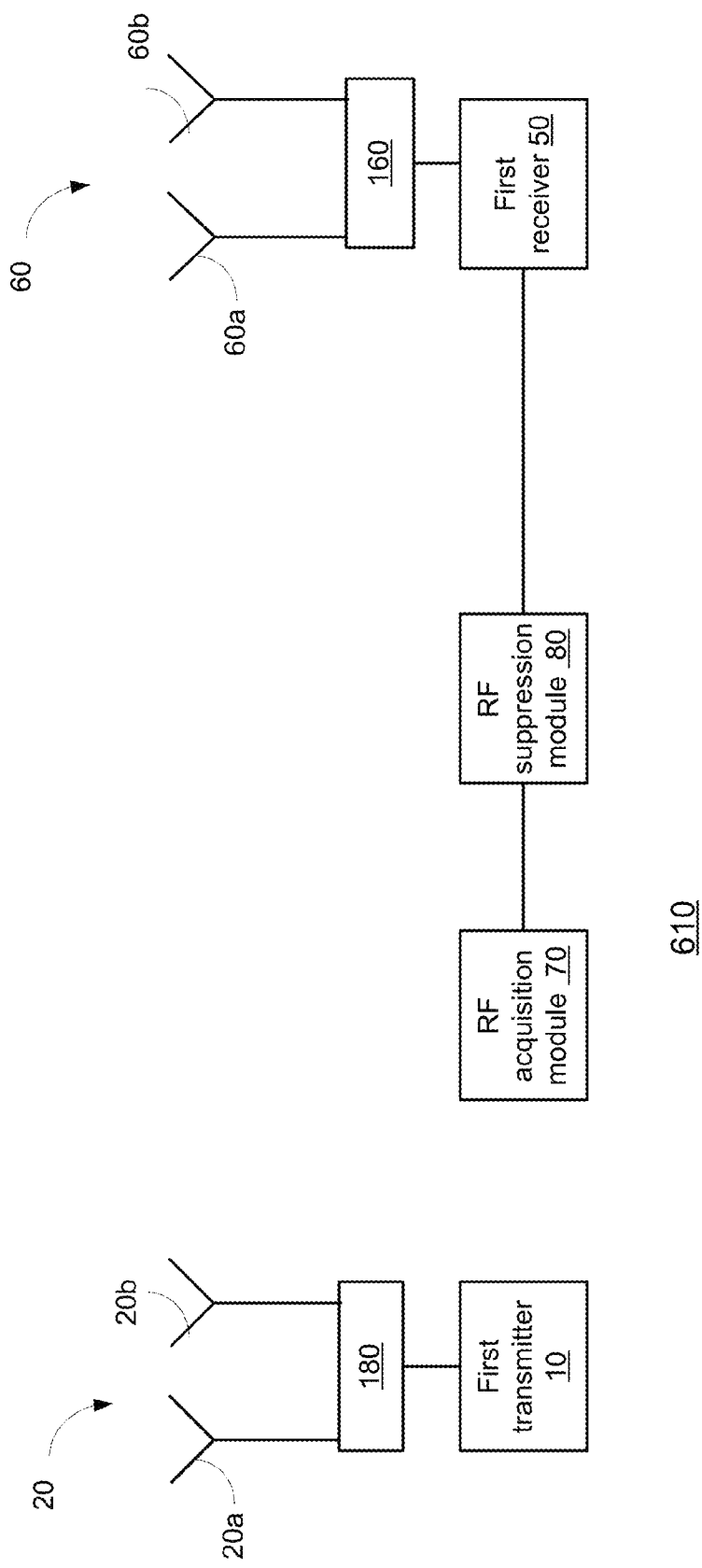
FIG. 10 illustrates a system according to an embodiment of the invention.

FIG. 10 illustrates system 610 according to an embodiment of the invention.

System 610 supports receive diversity and transmit diversity.

The first transmitter 10 is coupled, via a first transmitter RF switch 180, to multiple first antennas 20a and 20b collectively denoted 20. The second RF switch 160 may be arranged to select at least one selected second antenna 60 of the multiple second antennas 60a and 60b—collectively denoted 60. In this scenario the RF suppression module 80 may be arranged to generate the RF suppression signals in response to a selection of the at least one second selected antenna and to a selection of at least one first antenna.

DECT and Cellular Transceivers

FIG. 11

Figure 11:
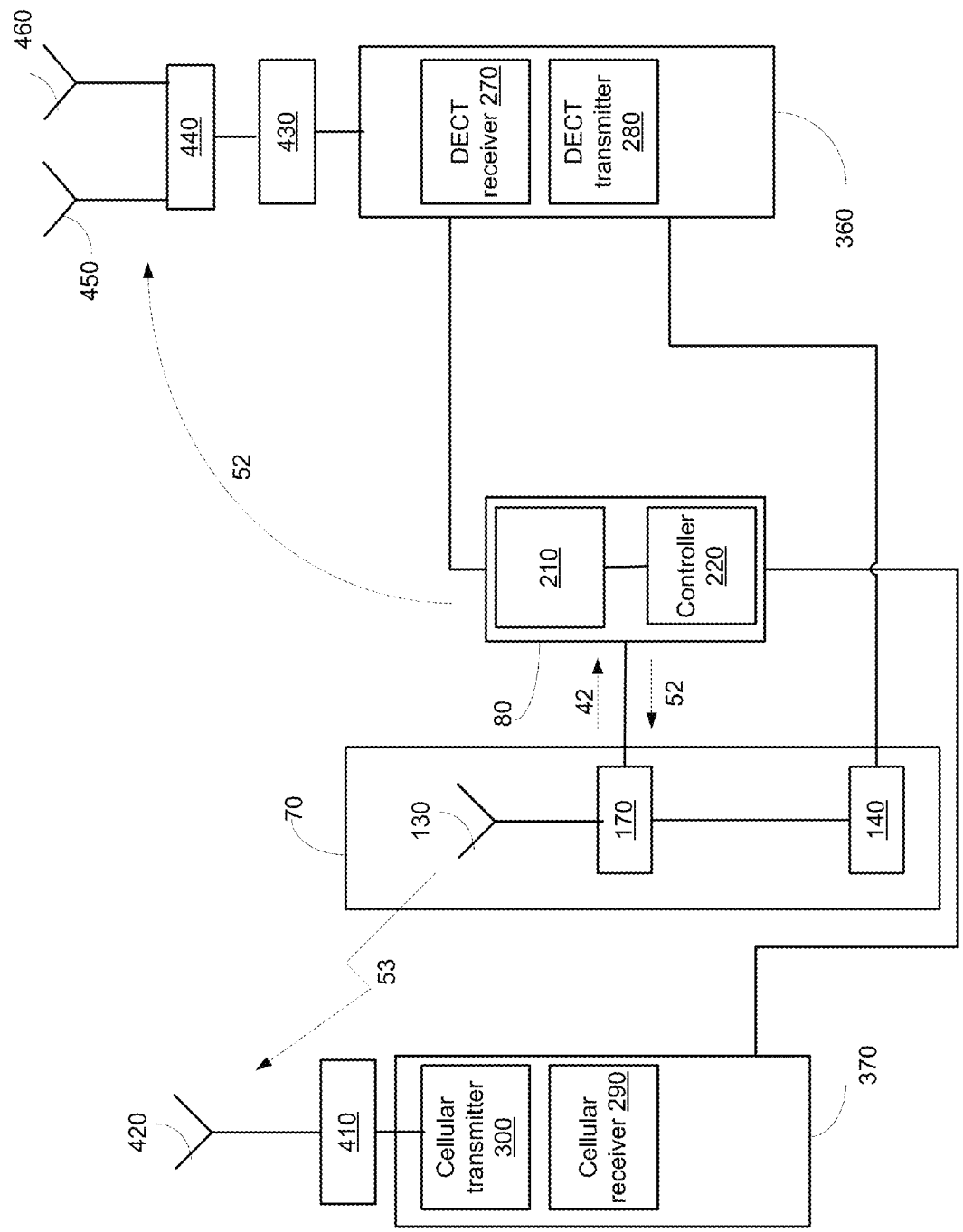
FIG. 11 illustrates a system according to an embodiment of the invention.

FIG. 11 illustrates a system 611 according to an embodiment of the invention.

System 611 includes a first transceiver than is a DECT transceiver 360, a second transceiver that is a cellular transceiver 370, a RF acquisition module 70 and a RF suppression module 80.

The DECT transceiver 360 includes a DECT receiver 270 and a DECT transmitter 280. The cellular transceiver 370 includes a cellular receiver 290 and a cellular transmitter 300.

The cellular transmitter 300 and the cellular receiver 290 are coupled via diplexer 410 to a single cellular antenna 420.

The RF suppression module 80 is illustrated as including a controller 220 and a configurable RF filter 210. The controller 220 can configure the configurable RF module 210.

The DECT receiver 270 and the DECT transmitter 280 are coupled via DECT RF switches 430 and 440 to first and second DECT antennas 450 and 460.

The RF suppression module 80 is arranged to provide RF suppression signals 53 to the first DECT antenna 450 and to second DECT antenna 460. The provision of these RF suppression signals 53 can be made by RF couplers (not shown in FIG. 11). The provision of the RF suppression signals 53 may be responsive to an identity of the DECT antenna that is being used to receive DECT signals.

First DECT switch 430 determines whether the first and second DECT antennas 450 and 460 are connected to the DECT receiver 270 or to the DECT transmitter 280.

Second DECT switch 440 selects a selected antenna out of the first and second DECT antennas 450 and 460.

The RF acquisition module 70 is illustrated as including third antenna 130 that is connected to an RF distribution module 170.

The RF distribution module 170 may perform a splitting operation that includes sending some of the RF energy received by the third antenna 130 to the RF suppression module 80 (as second RF signals 42) while sending some of the RF energy to RF detector 140. RF detector 140 may provide to the DECT transceiver 360 an indication about a transmission by the cellular transmitter 300.

Additionally or alternatively, the RF distribution module 170 can be arranged to receive additional RF suppression signals 52 from the RF suppression module 80 and send these additional RF suppression signals 52 towards the third antenna 130 to be transmitted towards the cellular receiver 290. It is noted that such an RF distribution module 170 can include a diplexer.

FIG. 12

Figure 12:
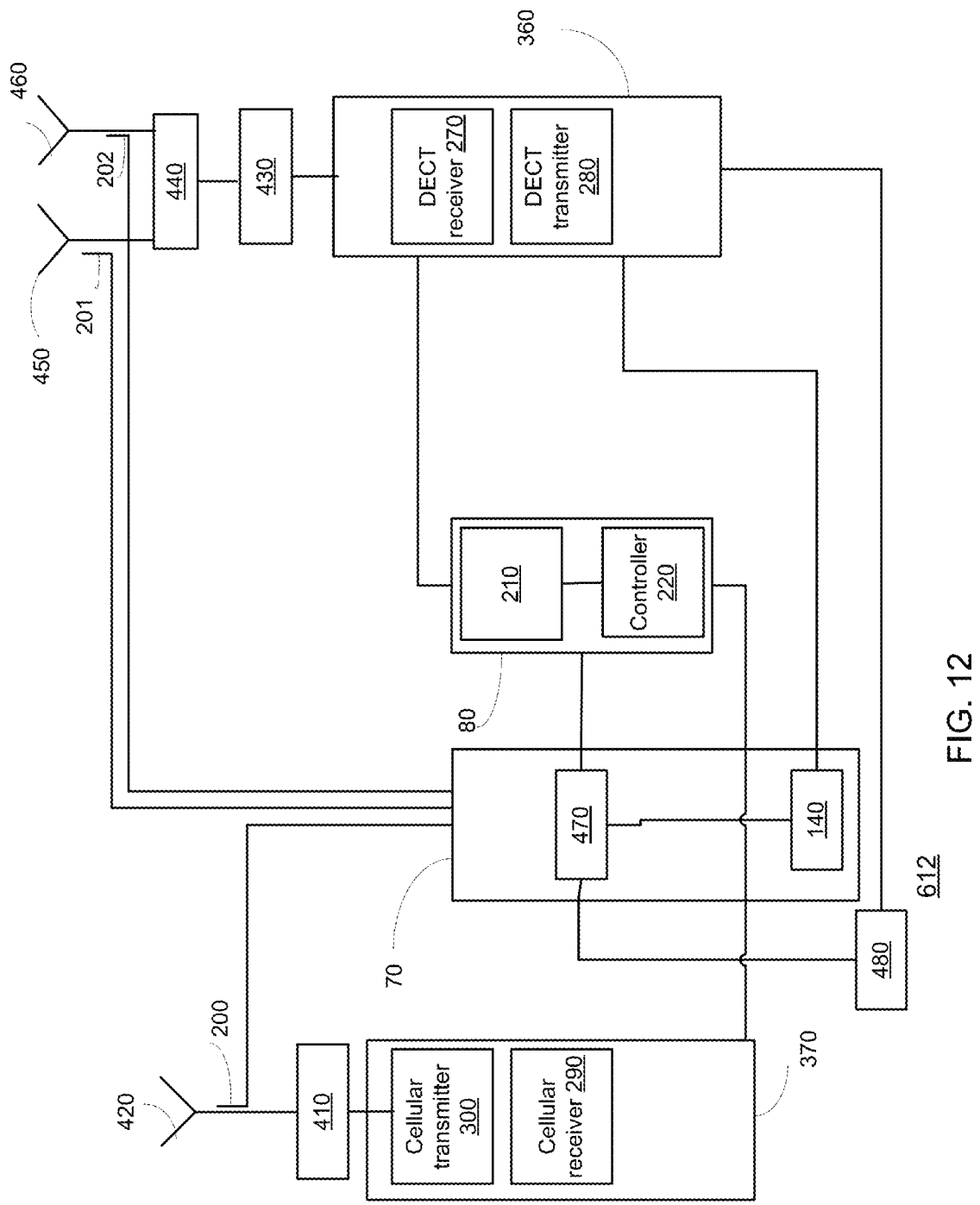
FIG. 12 illustrates a system according to an embodiment of the invention.

FIG. 12 illustrates a system 612 according to an embodiment of the invention.

System 612 of FIG. 12 differs from the system 611 of FIG. 11 by:
  1. Including a RF splitter 170.
  2. Including RF couplers 200-202. RF couplers 200-202 are coupled between the RF acquisition module 70 and each one of first DECT antenna 450, and second DECT antenna 460 respectively. Each of these RF couplers 200-202 can be coupled to another component of the cellular transceiver 370 or the DECT transceiver 360 to receive RF signals.
  3. Including a RF measurement module 480. The RF measurement module 480 can measure the RF signals it receives.

4. Including an RF detector 140 that is coupled to the splitter 470. The RF splitter 470 is also coupled to an RF measurement module 480. The RF detector 140 can provide an activity indication—indicative of cellular transmission.
5. Not including the third antenna 130.
6. Not including the RF distribution module 170.

The RF measurement module 480 may be a degenerated RF receiver or any other receiver capable of measuring RF signals samples obtained by the RF coupler 200 from the cellular antenna 420.

In any one of systems 611 or 612 the DECT transceiver 360 may provide various indications to the RF suppression circuit 80—these indication can provide timing of events such as DECT transmission, can include reception parameters relating to the received signals, which DECT antenna is being selected and the like. According to another embodiment of the invention the DECT transceiver 360 may not provide such indication. The DECT transceiver 360 may receive control signals from the RF suppression circuit 80 (such as an "enter to test mode" control signal) or may not receive such signals.

In any one of systems 611 or 612 the cellular transceiver 370 may provide various indications to the RF suppression circuit 80—these indication can provide timing of events such as cellular transmission, can include reception parameters relating to the received signals, which cellular antenna is being selected and the like. According to another embodiment of the invention the cellular transceiver 370 may not provide such indication. The cellular transceiver 370 may receive control signals from the RF suppression circuit 80 (such as an "enter to test mode" control signal) or may not receive such signals.

Non-limiting examples of information that can be provided to the controller 220 includes a channel that is being used by the cellular receiver and/or the cellular transmitter, a transmit power level, an RSSI of RF signals received by the cellular receiver, a quality of the RF signals received by the cellular receiver (e.g. PER/FER/BER, or some other metrics), exact timing of that transmission by the cellular transmitter, exact timing of reception by the cellular receiver, and the like.

The effect of the DECT transmitter 280 on the cellular receiver 290 can be learnt by receiving information from the cellular transceiver 370. This information may include receiving indirect indications about the level of DECT interference, such as PER/FER and/or RSSI indications. Thus can also be learnt from the RE measurement module 480.

An iteration of a calibration process of the RF suppression module 80 can include: Setting the cellular receiver in a test mode in the same channel used for normal operation of the cellular receiver, reading RSSI measurements from the cellular receiver when the DECT transmitter is not transmitting, start transmitting by the DECT transmitter (in test mode or in operational), reading the RSSI measurements by the cellular receiver, and tune the configurable RF filter to receive the lowest readings of the RSSI by the cellular receiver.

This configuration process can be repeated when the DECT channel frequency is changed or when the cellular channel is changed.

Configurable RF Filter

Various configurable RF filters can be provided. The overall frequency response of the configurable RF filters, the receive antennas and transmit antennas and the medium (air) through which the RF signals propagate between the pairs of receivers and transmitters may form a notch at the frequency of interferences.

A configurable RF filter may include one or more configurable resonant circuits such as parallel LC circuits that may include a variable capacitor that is coupled in parallel to an inductor. The complex impedance of a configurable resonant circuit can be very high (ideally infinity) at their resonance frequency, and can have either negative or positive imaginary part at frequencies that are either lower than the resonance frequency or higher than the resonance frequency accordingly. By changing the capacitance of the variable capacitor a desired impedance can be achieved.

The configurable RF filter may also include transmission lines that may act as delay lines. The delay can be set to any desired phase delay in order to cause the pure imaginary impedance of the configurable resonant circuits to effect either the real or the imaginary component of the overall response between the transceiver ports.

Using two pairs of delay lines of delay of one eights of a wavelength each provides a phase shift of ninety degrees.

FIG. 13

Figure 13:
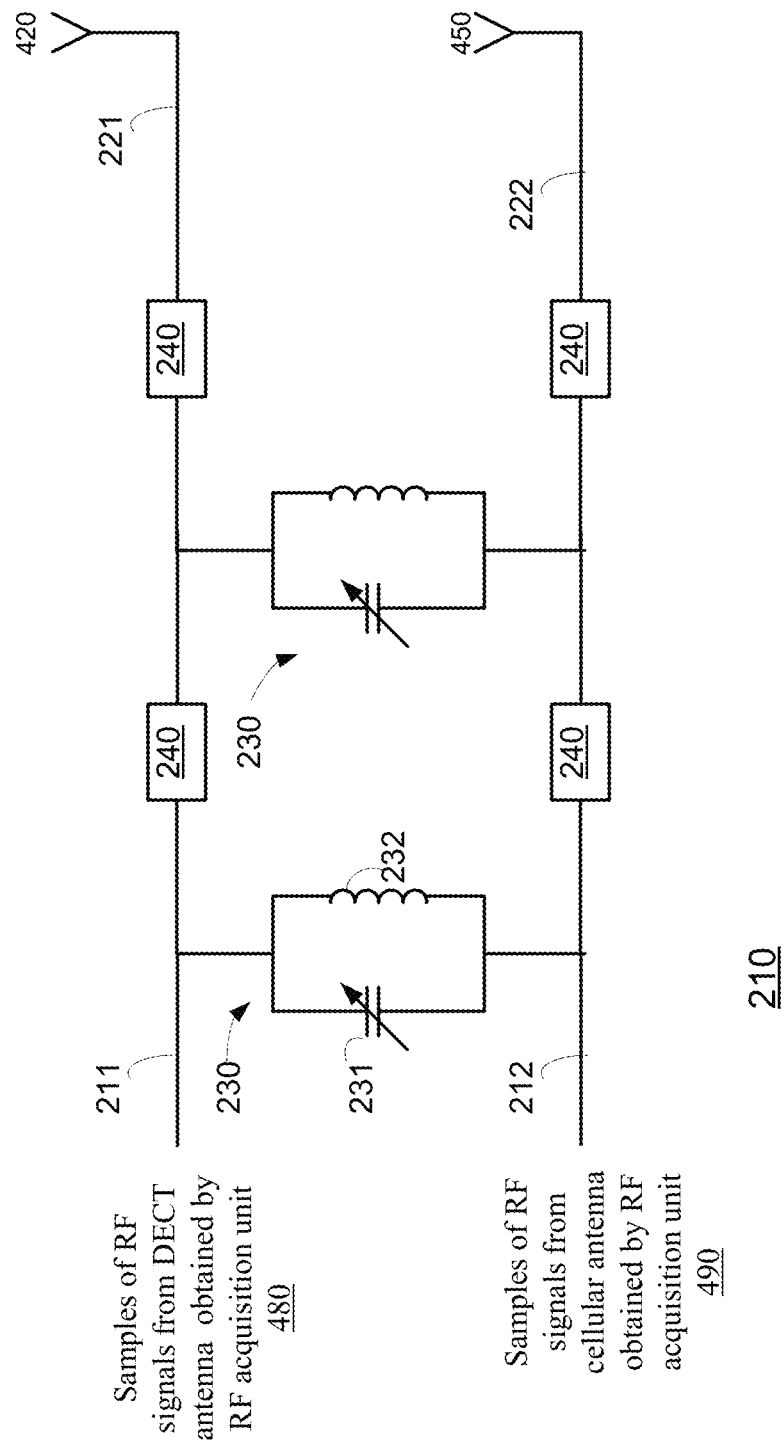
FIG. 13 illustrates a configurable RF module according to an embodiment of the invention.

FIG. 13 illustrates a configurable RF filter 210 according to an embodiment of the invention.

The configurable RF filter 210 is illustrated as a four-port network having two input terminals 211 and 212 connected to the transceivers and two output terminals 221 and 222 connected to the antennas.

For simplicity of explanation it is assumed that the DECT transceiver has a single DECT antenna 450.

A first configurable resonant module 230 is coupled between the two input terminals 211 and 212. A first pair of delay element 240 is coupled between the first configurable resonant module 230 and a second configurable resonant module 230.

The configurable RF filter 210 also includes a second pair of delay elements 240 that are coupled to via output terminals 221 and 222 to DECT antenna 450 and cellular antenna 420 respectively.

The delay elements introduce a delay of one eighth wavelength each.

Input terminal 211 receives samples 480 of RF signals from the DECT antenna obtained by the RF acquisition unit. Input terminal 212 receives samples 490 of RF signals from the cellular antenna obtained by the RF acquisition unit.

An upper path of the configurable RF filter 210 spans between input terminal 211 and output terminal 221 and illustrates the RF suppression operation applied on DECT signals in order to suppress the effect of the DECT transmission on the cellular receiver.

A lower path of the configurable RF filter 210 spans between input terminal 212 and output terminal 222 and illustrates the RF suppression operation applied on cellular signals in order to suppress the effect of the cellular transmission on the DECT receiver.

The configuration process includes altering the capacitance of the capacitors 231 of the configurable resonant modules 230 while maintaining the inductance of inductors 232 unchanged. It is noted that any other technique for changing the resonance frequency of the configurable resonant modules can be applied.

FIG. 14

Figure 14:
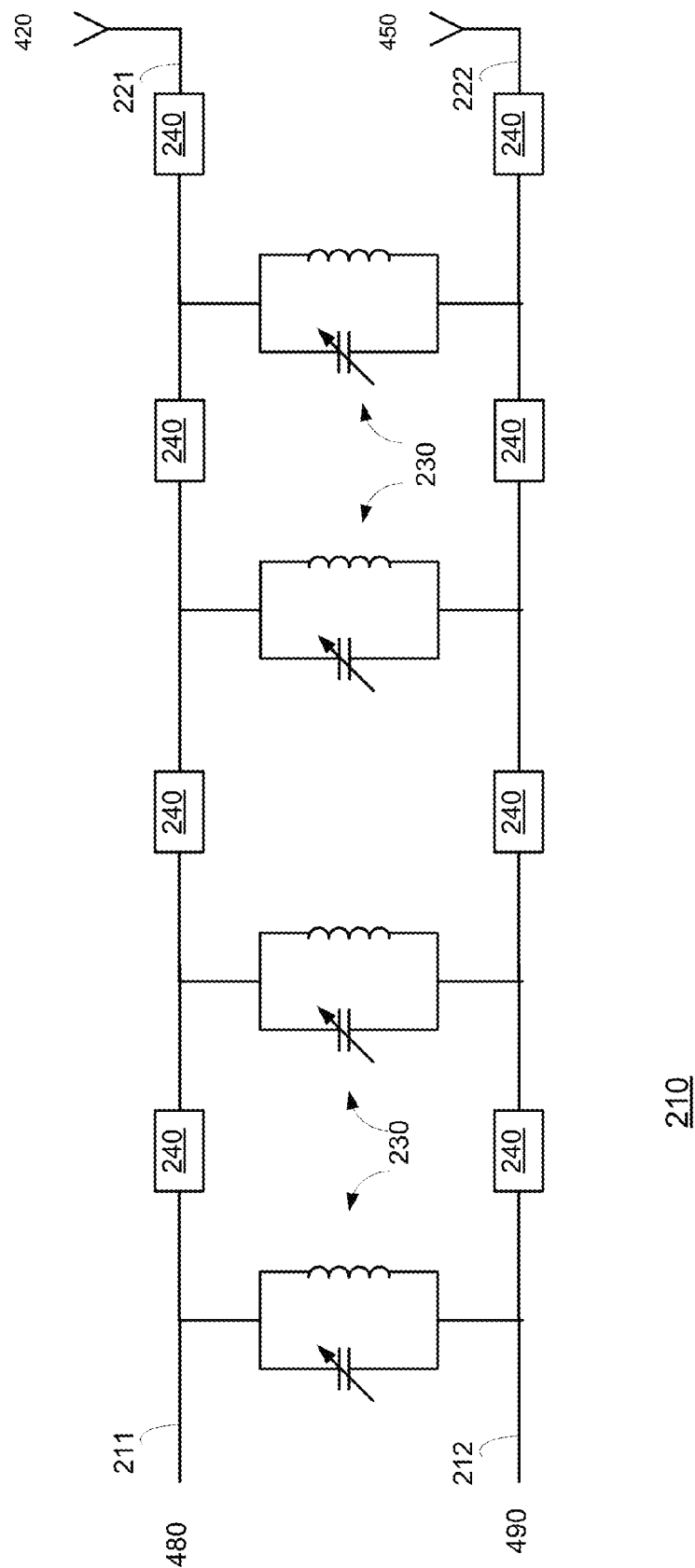
FIG. 14 illustrates a configurable RF module according to an embodiment of the invention.

FIG. 14 illustrates a configurable RF filter 210 according to another embodiment of the invention.

The configurable RF filter of FIG. 14 differs from the configurable RF filter of FIG. 13 by having four configurable resonant modules 230 and four pairs of delay lines 240 coupled between them.

FIG. 15

Figure 15:
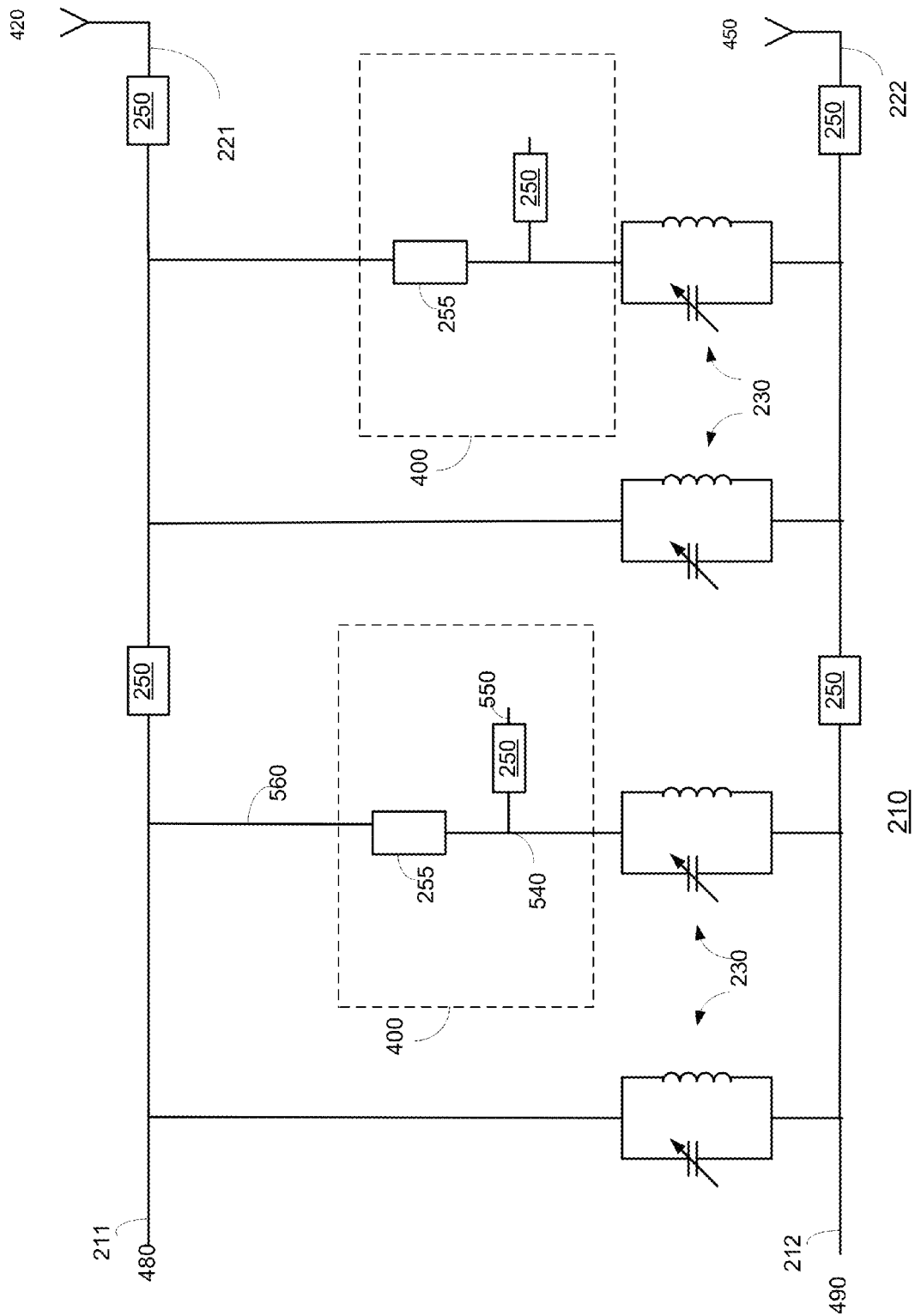
FIG. 15 illustrates a configurable RF module according to an embodiment of the invention.

FIG. 15 includes four configurable resonant modules 230, two pairs of delay lines 240 and two frequency discriminating modules 400.

A first configurable resonant module 230 is coupled in parallel to input ports 211 and 212.

Input port 211 is also coupled to a first delay line 240 and to an upper terminal of a first frequency discriminating module 400. The other side of the first delay line 240 is coupled to a second delay line 240, to an upper terminal of a third configurable resonant module 230 and to an upper terminal of a second frequency discriminating module 400. The other side of the second delay line 240 is coupled via output terminal 221 to cellular antenna 420.

The first and third resonant modules 230 control predominantly the real and imaginary components of the transmission coefficient between the transceiver ports 480 and 490. The second and fourth resonant modules 230 control predominantly the rate of change in frequency of the real and imaginary components of the transmission coefficient between the transceiver ports 480 and 490. By having control over both the complex transmission coefficient and its rate of change in frequency, better interference suppression characteristics can be achieved over broader range of frequencies. This capability is of importance, for example, in presence of group delay characteristics of the leakage between the antennas 420 and 450.

Input port 212 is coupled to a lower terminal of first and second configurable resonant modules 230 and to a third delay line 240. The other end of the third delay line 240 is coupled to a fourth delay line and to the lower terminals of the third and fourth configurable resonant modules 230. The other side of the fourth delay line 240 is coupled via output terminal 222 to DECT antenna 450.

The upper terminal of the second configurable resonant module 230 is coupled to a lower terminal of the first frequency discriminating module 400.

The upper terminal of the fourth configurable resonant module 230 is coupled to a lower terminal of the second frequency discriminating module 400.

Each frequency discriminating module 400 outputs a signal that is representative to a change in a current frequency of filtered RF signals to a predefined frequency (such as the resonant frequency of the configurable resonant module 230) and thus allows to track the change rate of the frequency.

FIG. 15 illustrates the frequency discriminating module 400 as including two transmission lines 250 and 255 each having a length of one fourth of a wavelength—one transmission line 250 has a first end that is "open" (electrically isolated)—as illustrated by node 550. Such a transmission line element open at one end is sometimes referred to as a "stub". The other end of that delay line is coupled to node 540. Node 540 virtually sees a short circuit and its voltage is responsive to a deviation in frequency.

Node 540 is the lower terminal of the frequency discriminating module 400. Node 540 is also coupled to a lower end of another impedance-transforming delay line 255 of the frequency discriminating module 400. The upper end of that delay line is coupled (via node 560) to the input terminal 211 and to stub delay line 250. Node 560 views an open circuit.

FIGS. 16-18

Figure 16:
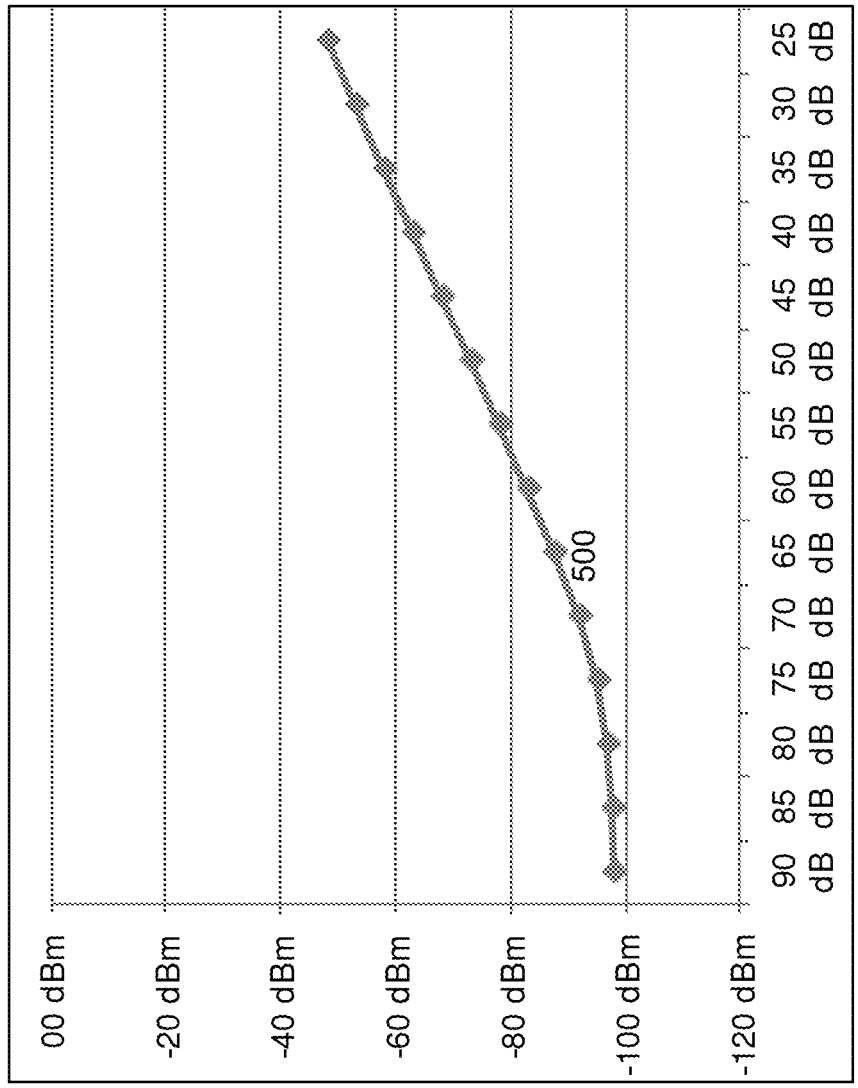
Figure 17:
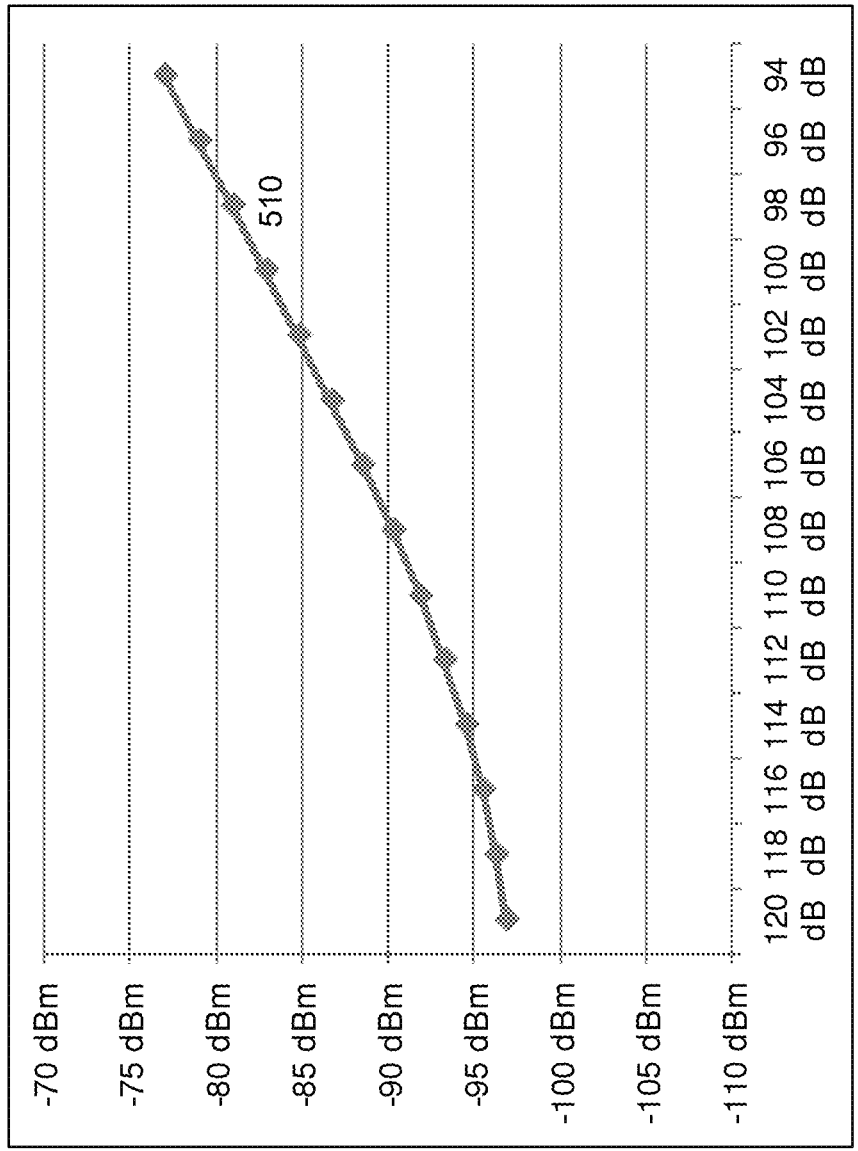

FIGS. 16-18 are simulation results of two scenarios according to an embodiment of the invention.

According to the first scenario the DECT transceiver has a transmission frequency range and a reception frequency range that has an upper limit of 1.9 GHz, while the cellular transmission frequency range has a lower limit of 2 GHz. It is assumed that the power of the RF signals transmitted by the cellular transmitter is about −60 dBc at the DECT reception frequency band.

According to the second scenario the DECT transceiver has a transmission frequency range and a reception frequency range that has an upper limit of 1.9 GHz, while the cellular transmission frequency range has a lower limit of 1.92 GHz. It is assumed that the power of the RF signals transmitted by the cellular transmitter is about −20 dBc at the DECT reception frequency band.

FIG. 16 includes curve 500 that illustrates the tradeoff between sensitivity of the DECT receiver versus the amount of RF suppression applied by the RF suppression module assuming the first scenario.

FIG. 17 includes curve 510 that illustrates the tradeoff between sensitivity of the DECT receiver versus the amount of RF suppression applied by the RF suppression module assuming the first scenario.

FIG. 18 illustrates the overall frequency response of the configurable RF filters, the receive antennas, the transmit antennas and the medium (air) through which the RF signals propagate between the pairs of receivers and transmitters at the two scenario according to an embodiment of the invention. The left graph includes a curve 520 that represents the overall frequency response according to the first scenario. The right graph includes a curve 530 that represents the overall frequency response according to the second scenario.

FIG. 19

According to various embodiments of the invention one or more methods can be provided for operating any of the mentioned above systems.

FIG. 19 illustrates method 1900. Method 1900 may include stage 1910 of activating a system such as any of the systems mentioned in any of the previous figures.

The following text provided non-limiting examples of embodiments of method 1900.

Stage 1910 may include transmitting by a first transmitter and via a first antenna first radio frequency (RF) signals; acquiring by an RF acquisition module second RF signals that are representative of the first RF signals; receiving by an RF suppression module, the second RF signals and generating RF suppression signals for suppressing an effect of a transmission of the first RF signals on the first receiver, and providing the RF suppression signals to the first receiver.

Method 1900 may include transmitting by the first transmitter according to a first communication standard and receiving signals by the first receiver according to a second communication standard that differs from the first communication standard.

Method 1900 can be executed by a system that includes a first transceiver and a second transceiver; wherein the first transceiver may include the first transmitter and a second receiver; and wherein the second transceiver may include the first receiver and a second transmitter.

Method 1900 may include generating, by the RF suppression module, additional RF suppression signals for suppressing an effect of a transmission by the second transmitter on the second receiver.

Method 1900 may include applying, by the RF suppression module, a same transfer function for suppressing the effect of the transmission by the second transmitter on the second receiver and for suppressing the effect of the transmission of the first RF signals on the first receiver.

The RF suppression module may include first terminals that are coupled to the first transceiver and second terminals that are coupled to the second transceiver; wherein the RF suppression module may include a configurable RF filter that may be coupled between the first terminals and the second terminals and wherein method 1900 may include applying, by the configurable RF filter, a same transfer function on RF signals that are received from the first terminals and on RF signals that are received from the second terminals.

The RF acquisition module may include a third antenna that differs from the first and second antennas; and method 1900 may include transmitting, by the RF suppression module the additional RF suppression signals via the third antenna.

The first transmitter may be coupled, via a first transmitter RF switch, to multiple first antennas; wherein method 1900 may include selecting, by the first transmitter RF switch, at least one selected first transmitter antenna of the multiple first antennas; and wherein method 1900 may include generating, by the RF suppression module, the RF suppression signals in response to a selection of the at least one first selected antenna.

The RF suppression module may include a sub-module per each selection of the at least one first selected first antenna.

The first receiver may be coupled, via a first receiver RF switch, to multiple second antennas; wherein method 1900 may include selecting, by the first receiver RF switch, at least one selected first receiver antenna of the multiple second antennas; and wherein method 1900 may include generating, by the RF suppression module, the RF suppression signals in response to a selection of the at least one second selected antenna.

The first transmitter may be coupled, via a first transmitter RF switch, to multiple first antennas; wherein method 1900 may include selecting, by the first transmitter RF switch, at least one selected first transmitter antenna of the multiple first antennas; and wherein method 1900 may include generating, by the RF suppression module, the RF suppression signals in response to a selection of the at least one first selected antenna and to a selection of the second selected antenna.

The first receiver may be coupled to multiple second antennas.

The first transmitter may be coupled to multiple first antennas.

Method 1900 may include receiving, by a third antenna of the RF acquisition module that differs from the first and second antennas, RF signals representative of the first RF signals.

Method 1900 may include wirelessly acquiring, by the RF acquisition module, the second RF signals.

The RF acquisition module may include a RF coupler that may be coupled to the first antenna or to a RF component of the first transmitter.

The RF suppression module may include a configurable RF filter; wherein the configurable RF filter may be coupled to a controller that belongs to the system; wherein method 1900 may include configuring, by the controller, the configurable RF filter during at least one configuration period.

Method 1900 may include configuring, by the controller, the configurable RF module according to a current configuration; evaluating an outcome of the current configuration to provide an evaluation result; determining whether the current configuration should be maintained or changed; and changing the current configuration if it is determined to change the current configuration.

Method 1900 may include evaluating by the controller, the outcome of the current configuration in response to a first transmitter transmission indicator.

Method 1900 may include generating, by the first transmitter, the first transmitter transmission indicator.

The RF acquisition module may include an RF coupler that may be coupled to the first antenna or to an RF component of the first transmitter; wherein the RF coupled may be used as input to an RF detection module, wherein method 1900 may include generating, by the RF detection module, the first transmitter transmission indicator.

The RF acquisition module may include a third antenna that differs from the first and second antennas; wherein the third antenna may be coupled to an RF detection module, wherein method 1900 may include generating, by the RF detection module, the first transmitter transmission indicator.

Method 1900 may include configuring a configurable RF filter that may include multiple configurable resonant modules and delay elements.

Method 1900 may include configuring a configurable RF filter that may include two input terminals, wherein a first configurable resonant module may be coupled between the two input terminals, wherein a first pair of delay elements may be coupled between the first configurable resonant module and a second resonant module.

Method 1900 may include configuring a configurable RF filter that may include a frequency discriminating module.

Method 1900 may include transmitting, by a first transmitter, cellular network compliant signals and receiving by the first receiver Digital Enhanced Cordless Telecommunications (DECT) compliant signals.

The first receiver and the first transmitter are positioned within a same housing.

There may be provided a method that may include acquiring by an RF acquisition module second RF signals that are representative of first RF signals that are transmitted through a first antenna that may be coupled to a first transmitter; receiving by an RF suppression module the second RF signals, generating by the RF suppression module RF suppression signals for suppressing an effect of a transmission of the first RF signals on a first receiver, and providing the RF suppression signals to the first receiver; wherein the first receiver may be coupled to a second antenna that differs from the first antenna; and a controller; wherein the RF suppression module may include a configurable RF filter; wherein method 1900 may include configuring the configurable RF filter during at least one configuration period.

The following reference numbers were allocated to the following elements:

First transmitter 10
First antenna 20, 20a. 20b
First RF signals 41
Second RF signals 42
Third RF signals 43
Fourth RF signals 44
Fifth RF signals 45
Sixth RF signals 46
Seventh RF signals 47
Eighth RF signals 48
First TX transmission indicator 51
Additional RF suppression signals 52
RF suppression signals 53
Second TX transmission indicator 54
First receiver 50
Second antenna 60, 60a, 60b
RF acquisition module 70
RF suppression module 80
First transceiver 90
Second transceiver 100
Second receiver 110
Second transmitter 120
Third antenna 130
RF detector 140
RF suppression sub-module 150
Second RF switch 160
RF distribution module 170

First RF switch 180
RF coupler 200, 201, 202
Configurable RF filter 210
Input terminals 211, 212
Output terminals 221, 222
Controller 220
Configurable resonant module 230
Variable capacitor 231
Inductor 232
Delay element 240
Stub element 250
Impedance transforming element 255
Housing 260
DECT receiver 270
DECT transmitter 280
Cellular receiver 290
Cellular transmitter 300
Fourth antenna 310
Fifth antenna 320
Sixth antenna 330
Second RF coupler 340
DECT transceiver 360
Cellular transceiver 370
First pair of delay elements 380
Second pair of delay elements 390
Frequency discriminating module 400
Diplexer 410
First DECT RF switch 430
Second DECT RF switch 440
First DECT antenna 450
Second DECT antenna 460
Splitter 470
Acquired RF signals (from DECT) 480
Acquired RF signals (from cellular) 490
Curves 500, 510, 520, 530
Nodes 540, 550, 560
System 601-612

The assignment of the same reference numbers to various components may indicate that these components are similar to each other.

In the foregoing specification, the invention has been described with reference to specific examples of embodiments of the invention. It will, however, be evident that various modifications and changes may be made therein without departing from the broader spirit and scope of the invention as set forth in the appended claims.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or module elements or impose an alternate decomposition of functionality upon various logic blocks or module elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system, comprising:
   a first transmitter;
   a first antenna, coupled to the first transmitter; wherein the first transmitter is arranged to transmit via the first antenna first radio frequency (RF) signals;
   a first receiver;
   a second antenna, coupled to the first receiver; the second antenna differs from the first antenna;
   an RF acquisition module that is arranged to acquire second RF signals that are representative of the first RF signals; and an RF suppression module, arranged to receive the second RF signals and to generate RF suppression signals for suppressing an effect of a transmission of the first RF signals on the first receiver, and to provide the RF suppression signals to the first receiver;

wherein the RF suppression module comprises a configurable RF filter;

wherein the configurable RF filter is coupled to a controller that belongs to the system;

wherein the controller is arranged to:

configure the configurable RF module according to a current configuration;

evaluate an outcome of the current configuration to provide an evaluation result;

determine whether the current configuration should be maintained or changed; and change the current configuration if it is determined to change the current configuration.

2. The system according to claim 1, wherein the first transmitter is arranged to transmit according a first communication standard and the first receiver is arranged to receive signals according to a second communication standard that differs from the first communication standard.

3. The system according to claim 1, comprising a first transceiver and a second transceiver;

wherein the first transceiver comprises the first transmitter and a second receiver; and wherein the second transceiver comprises the first receive and a second transmitter.

4. The system according to claim 3, wherein the RF suppression module is further adapted to generate additional RF suppression signals for suppressing an effect of a transmission by the second transmitter on the second receiver.

5. The system according to claim 1, wherein the first receiver is coupled to multiple second antennas.

6. The system according to claim 1, wherein the first transmitter is coupled to multiple first antennas.

7. The system according to claim 1, wherein the RF acquisition module is arranged to wirelessly acquire the second RF signals.

8. The system according to claim 1, wherein the RF acquisition module comprises a RF coupler that is coupled to the first antenna or to a RF component of the first transmitter.

9. The system according to claim 1, wherein the controller is arranged to evaluate the outcome of the current configuration in response to a first transmitter transmission indicator.

10. The system according to claim 9, wherein the first transmitter is arranged to generate the first transmitter transmission indicator.

11. The system according to claim 9, wherein the RF acquisition module comprises a RF coupler that is coupled to the first antenna or to a RF component of the first transmitter; wherein the RF coupled is coupled to an RF detection module that is arranged to generate the first transmitter transmission indicator.

12. The system according to claim 9, wherein the RF acquisition module comprises a third antenna that differs from the first and second antennas; wherein the third antenna is coupled to a RF detection module that is arranged to generate the first transmitter transmission indicator.

13. The system according to claim 1, wherein the configurable RF filter comprises multiple configurable resonant modules and delay elements.

14. The system according to claim 1, wherein the configurable RF filter comprises two input terminals, wherein a first configurable resonant module is coupled between the two input terminals, wherein a first pair of delay elements is coupled between the first configurable resonant module and a second resonant module.

15. The system according to claim 1, wherein the configurable RF filter comprising a frequency discriminating module.

16. A system, comprising:

a first transceiver;

a second transceiver; wherein the first transceiver comprises a first transmitter and a second receiver; and wherein the second transceiver comprises a first receiver and a second transmitter;

a first antenna, coupled to the first transmitter; wherein the first transmitter is arranged to transmit via the first antenna first radio frequency (RF) signals;

a second antenna, coupled to the first receiver; the second antenna differs from the first antenna;

an RF acquisition module that is arranged to acquire second RF signals that are representative of the first RF signals; and an RF suppression module, arranged to receive the second RF signals and to generate RF suppression signals for suppressing an effect of a transmission of the first RF signals on the first receiver, and to provide the RF suppression signals to the first receiver;

wherein the RF suppression module is further adapted to generate additional RF suppression signals for suppressing an effect of a transmission by the second transmitter on the second receiver;

wherein the RF suppression module is arranged to apply a same transfer function for suppressing the effect of the transmission by the second transmitter on the second receiver and for suppressing the effect of the transmission of the first RF signals on the first receiver.

17. The system according to claim 16, wherein the RF suppression module comprises first terminals that are coupled to the first transceiver and second terminals that are coupled to the second transceiver; wherein the RF suppression module comprises a configurable RF filter that is coupled between the first terminals and the second terminals and wherein the configurable RF filter is arranged to apply a same transfer function on RF signals that are received from the first terminals and on RF signals that are received from the second terminals.

18. A system, comprising:

a first transceiver;

a second transceiver; wherein the first transceiver comprises a first transmitter and a second receiver; and wherein the second transceiver comprises a first receiver and a second transmitter;

a first antenna, coupled to the first transmitter; wherein the first transmitter is arranged to transmit via the first antenna first radio frequency (RF) signals;

a second antenna, coupled to the first receiver; the second antenna differs from the first antenna;

an RF acquisition module that is arranged to acquire second RF signals that are representative of the first RF signals; and an RF suppression module, arranged to receive the second RF signals and to generate RF suppression signals for suppressing an effect of a transmission of the first RF signals on the first receiver, and to provide the RF suppression signals to the first receiver;

wherein the RF acquisition module comprises a third antenna that differs from the first and second antennas; and wherein the RF suppression module is adapted to transmit the additional RF suppression signals via the third antenna.

19. A system, comprising:
a first transmitter;
a first antenna, coupled to the first transmitter; wherein the first transmitter is arranged to transmit via the first antenna first radio frequency (RF) signals;
a first receiver;
a second antenna, coupled to the first receiver; the second antenna differs from the first antenna;
an RF acquisition module that is arranged to acquire second RF signals that are representative of the first RF signals; and
an RF suppression module, arranged to receive the second RF signals and to generate RF suppression signals for suppressing an effect of a transmission of the first RF signals on the first receiver, and to provide the RF suppression signals to the first receiver;
wherein the first transmitter is coupled, via a first transmitter RF switch, to multiple first antennas;
wherein the first transmitter RF switch is arranged to select at least one selected first transmitter antenna of the multiple first antennas; and
wherein the RF suppression module is arranged to generate the RF suppression signals in response to a selection of the at least one first selected antenna.

20. The system according to claim 19, wherein the RF suppression module comprises a sub-module per each selection of the at least one first selected first antenna.

21. A system, comprising:
a first transmitter;
a first antenna, coupled to the first transmitter; wherein the first transmitter is arranged to transmit via the first antenna first radio frequency (RF) signals;
a first receiver;
a second antenna, coupled to the first receiver; the second antenna differs from the first antenna;
an RF acquisition module that is arranged to acquire second RF signals that are representative of the first RF signals; and
an RF suppression module, arranged to receive the second RF signals and to generate RF suppression signals for suppressing an effect of a transmission of the first RF signals on the first receiver, and to provide the RF suppression signals to the first receiver;
wherein the first receiver is coupled, via a first receiver RF switch, to multiple second antennas;
wherein the first receiver RF switch is arranged to select at least one selected first receiver antenna of the multiple second antennas; and
wherein the RF suppression module is arranged to generate the RF suppression signals in response to a selection of the at least one second selected antenna.

22. The system according to claim 21, wherein the first transmitter is coupled, via a first transmitter RF switch, to multiple first antennas;
wherein the first transmitter RF switch is arranged to select at least one selected first transmitter antenna of the multiple first antennas; and
wherein the RF suppression module is arranged to generate the RF suppression signals in response to a selection of the at least one first selected antenna and to a selection of the second selected antenna.

23. A system, comprising:
a first transmitter;
a first antenna, coupled to the first transmitter; wherein the first transmitter is arranged to transmit via the first antenna first radio frequency (RF) signals;
a first receiver;
a second antenna, coupled to the first receiver; the second antenna differs from the first antenna;
an RF acquisition module that is arranged to acquire second RF signals that are representative of the first RF signals; and
an RF suppression module, arranged to receive the second RF signals and to generate RF suppression signals for suppressing an effect of a transmission of the first RF signals on the first receiver, and to provide the RF suppression signals to the first receiver;
wherein the RF acquisition module comprises a third antenna that differs from the first and second antennas for receiving RF signals representative of the first RF signals.

24. The system according to claim 23, wherein the RF suppression module comprises a configurable RF filter; wherein the configurable RF filter is coupled to a controller that belongs to the system; wherein the controller is arranged to configure the configurable RF filter during at least one configuration period.

25. The system according to claim 24, wherein the controller is arranged to:
configure the configurable RF module according to a current configuration;
evaluate an outcome of the current configuration to provide an evaluation result;
determine whether the current configuration should be maintained or changed; and
change the current configuration if it is determined to change the current configuration.

* * * * *